(12) United States Patent
Han et al.

(10) Patent No.: US 11,567,286 B2
(45) Date of Patent: Jan. 31, 2023

(54) CAMERA MODULE AND OPTICAL DEVICE

(71) Applicant: LG INNOTEK CO., LTD., Seoul (KR)

(72) Inventors: Sang Yeon Han, Seoul (KR); Young Taek Oh, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 347 days.

(21) Appl. No.: 16/743,896

(22) Filed: Jan. 15, 2020

(65) Prior Publication Data
US 2020/0150377 A1 May 14, 2020

Related U.S. Application Data

(63) Continuation of application No. 15/743,217, filed as application No. PCT/KR2016/007351 on Jul. 7, 2016, now Pat. No. 10,571,643.

(30) Foreign Application Priority Data

Jul. 9, 2015 (KR) .......................... 10-2015-0097827
Aug. 11, 2015 (KR) .......................... 10-2015-0113017

(51) Int. Cl.
*G02B 7/02* (2021.01)
*G03B 3/10* (2021.01)
(Continued)

(52) U.S. Cl.
CPC ................ *G02B 7/02* (2013.01); *G02B 7/025* (2013.01); *G02B 7/09* (2013.01); *G03B 3/10* (2013.01);
(Continued)

(58) Field of Classification Search
CPC . G02B 7/02; G02B 7/025; G02B 7/09; G03B 3/10; G03B 17/12;
(Continued)

(56) References Cited

U.S. PATENT DOCUMENTS 4,291,944 A   9/1981 Nomura
6,064,533 A   5/2000 Kenin et al.
(Continued)

FOREIGN PATENT DOCUMENTS

CN    1870724 A    11/2006
CN    101382636 A   3/2009
(Continued)

OTHER PUBLICATIONS

Office Action dated Jan. 17, 2020 in Chinese Application No. 201680040334.9.
(Continued)

*Primary Examiner* — Tuyen Tra
(74) *Attorney, Agent, or Firm* — Saliwanchik, Lloyd & Eisenschenk

(57) ABSTRACT

The present embodiment relates to a camera module comprising: a bobbin, which has a through-hole formed therein; a lens module, which is accommodated in the through-hole and is coupled to the bobbin; a protrusion formed to protrude from the outer peripheral surface of the lens module; and a recess formed to be recessed from the inner peripheral surface of the bobbin so as to accommodate at least a part of the protrusion, wherein the recess comprises a first guide portion, which extends downwards from the upper end of the bobbin, and a second guide portion, which extends so as to slope from the first guide portion.

20 Claims, 14 Drawing Sheets

(51) Int. Cl.
  *H04N 5/225* (2006.01)
  *G02B 7/09* (2021.01)
  *G03B 17/12* (2021.01)
(52) U.S. Cl.
  CPC ........... *G03B 17/12* (2013.01); *H04N 5/2254* (2013.01); *H04N 5/2257* (2013.01); *H04N 5/22521* (2018.08); *G03B 2205/0069* (2013.01)
(58) Field of Classification Search
  CPC ....... G03B 2205/0069; H04N 5/22521; H04N 5/2254; H04N 5/2257; H04N 5/232
  USPC .......................................... 359/642, 811, 819
  See application file for complete search history.

(56) References Cited

U.S. PATENT DOCUMENTS

| | | | |
|---|---|---|---|
| 9,618,768 B2* | 4/2017 | Yeo | ......................... G03B 3/10 |
| 2009/0097141 A1 | 4/2009 | Iwasa | |
| 2010/0060776 A1 | 3/2010 | Topliss et al. | |
| 2013/0242420 A1 | 9/2013 | Chou | |
| 2014/0355120 A1* | 12/2014 | Yeo | ......................... G03B 3/10 |
| | | | 359/557 |

FOREIGN PATENT DOCUMENTS

| | | |
|---|---|---|
| CN | 101578755 A | 11/2009 |
| CN | 101645640 A | 2/2010 |
| CN | 101887159 A | 11/2010 |
| CN | 102087396 A | 6/2011 |
| CN | 104614836 A | 5/2015 |
| CN | 104698566 A | 6/2015 |
| JP | 06-277173 A | 10/1994 |
| JP | 2006-091067 A | 4/2006 |
| JP | 2006-330121 A | 12/2006 |
| KR | 10-2015-0051685 A | 5/2015 |
| KR | 10-2015-0064997 A | 6/2015 |
| KR | 10-2015-0066819 A | 6/2015 |
| TW | 201304387 A1 | 1/2013 |

OTHER PUBLICATIONS

International Search Report in International Application No. PCT/KR2016/007351, filed Jul. 7, 2016.
Office Action dated Jan. 10, 2019 in U.S. Appl. No. 15/743,217.
Office Action dated Jul. 19, 2019 in U.S. Appl. No. 15/743,217.
Notice of Allowance dated Oct. 15, 2019 in U.S. Appl. No. 15/743,217.
Office Action dated Mar. 29, 2022 in Korean Application No. 10-2015-0113017.
Office Action dated Dec. 3, 2021 in Chinese Application No. 202011474352.2.

* cited by examiner

CAMERA MODULE AND OPTICAL DEVICE

CROSS-REFERENCE TO RELATED APPLICATIONS

This application is a continuation of U.S. application Ser. No. 15/743,217, filed Jan. 9, 2018; which is the U.S. national stage application of International Patent Application No. PCT/KR2016/007351, filed Jul. 7, 2016, which claims priority to Korean Application Nos. 10-2015-0097827, filed Jul. 9, 2015, and 10-2015-0113017, filed Aug. 11, 2015, the disclosures of each of which are incorporated herein by reference in their entirety.

TECHNICAL FIELD

The teachings in accordance with exemplary and non-limiting embodiments of this invention relate generally to a camera module and an optical apparatus.

BACKGROUND ART

Concomitant with widely generalized dissemination of various mobile terminals and commercialization of wireless Internet services, demands by consumers related to mobile terminals are diversified to prompt various types of peripheral devices or additional equipment to be mounted on mobile terminals. Inter alia, camera modules may be representative items photographing an object in a still picture or a video.

The conventional camera module was manufactured in such a manner that a lens driving unit is manufactured separately from a lens module. That is, the camera module was manufactured in such a fashion that the manufactured lens driving unit is coupled by a lens module. At this time, the lens driving unit and the lens module was coupled by an adhesive. Meantime, when an external force exceeding an adhesive force of the adhesive is applied to the conventional camera module, the lens module suffers a disadvantage in that the lens module is problematically moved from the lens driving unit. Inter alia, the position of the lens module is disadvantageously deformed to generate a defect in resolution in a shock test performed to the manufactured camera module.

Furthermore, although there was no big influence on alignment between a lens module assembly assembled on a PCB (Printed Circuit Board) and the PCB, in case of the conventional camera module, the alignment exerts a great influence on the quality of camera module because the recent trend is that size of a camera module is miniaturized and a much higher quality is required.

When drooping (deflection) at both sides of lens barrel assembly is not even, focuses of lens barrel assembly and the PCB are not in focus (not matched) to disadvantageously generate a quality problem to the camera module.

DETAILED DESCRIPTION OF THE INVENTION

Technical Subject

In order to solve the abovementioned problems/disadvantages, exemplary embodiments of the present invention provide a camera module that has secured reliability to external shocks through a locking structure between a lens module and a bobbin.

It is an object of an exemplary embodiment of the present invention to provide a lens driving apparatus and a camera module including the lens driving apparatus, whereby the lens driving apparatus and the camera module including the lens driving apparatus can inhibit a problem of a lens barrel assembly and a PCB not being in focus when the drooping at both sides of the lens barrel assembly is uneven to thereby improve the quality of camera module much higher.

Technical Solution

In one general aspect of the present invention, there is provided a camera module, the camera module comprising: a bobbin, which has through-hole formed therein; a lens module, which is accommodated in the through-hole and is coupled to the bobbin; a protrusion formed to protrude from the outer peripheral surface of the lens module; and a recess formed to be recessed from the inner peripheral surface of the bobbin so as to accommodate at least a part of the protrusion, wherein the recess comprises a first guide portion, which extends downwards from the upper end of the bobbin, and a second guide portion, which extends so as to slope from the first guide portion.

Preferably, but not necessarily, the first guide portion may be extended from the upper end of the bobbin to an optical axis direction, and the second guide portion may be extended from the first guide portion to direction perpendicular to an optical axis.

Preferably, but not necessarily, the protrusion may include a first protrusion and a second protrusion discretely disposed at an outer peripheral surface of the lens module, wherein the first protrusion and the second protrusion may be symmetrical based on an optical axis.

Preferably, but not necessarily, the recess may include a first groove, which accommodates at least a part of the first protrusion and a second groove, which accommodates at least a part of the second protrusion.

Preferably, but not necessarily, the bobbin may be disposed with an adhesive infusion hole extended from the upper end of the bobbin to the second guide portion, wherein the adhesive infusion hole may be spaced apart from the first guide portion.

Preferably, but not necessarily, an adhesive adhering and fixing the protrusion to the recess may be infused into the adhesive infusion hole.

Preferably, but not necessarily, the adhesive may be epoxy hardened by any one of UV (ultraviolet) rays and heat.

Preferably, but not necessarily, a length of the first guide portion to an optical axis direction may be longer than that of the protrusion to the optical axis direction.

Preferably, but not necessarily, a length of a direction perpendicular to an optical axis of the second guide portion may be longer than that of direction perpendicular to an optical axis of the protrusion.

Preferably, but not necessarily, the protrusion may take a cubic shape.

Preferably, but not necessarily, the protrusion may be so disposed as to be spaced apart from the upper end of the bobbin.

Preferably, but not necessarily, the protrusion may be disposed at an upper surface of the bobbin.

Preferably, but not necessarily, the upper end of the bobbin may be disposed at an upper side over an upper end of the lens module when the protrusion is accommodated in the second guide portion, and a bottom end of the bobbin may be disposed at a bottom side below a bottom end of the lens module.

Preferably, but not necessarily, an outer peripheral surface of the lens module may be spaced apart from an inner peripheral surface of the bobbin.

Preferably, but not necessarily, a protrusion length of the protrusion may be longer than a discrete distance between the lens module and the bobbin.

Preferably, but not necessarily, the camera module may further comprise: a housing, which accommodates the bobbin at an inner side thereof; a coil disposed at the bobbin; a magnet disposed at the housing to face the coil; and an elastic member coupled to the bobbin and the housing.

Preferably, but not necessarily, the camera module may further comprise: a base disposed at bottom side of the housing; a substrate disposed at an upper surface of the base; an FP coil portion disposed at the substrate to face the magnet; and a lateral support member coupled to the elastic member and the FP coil portion.

Preferably, but not necessarily, the camera module may further comprise: a first Hall sensor disposed on the substrate to detect a magnetic force of the magnet; and a second Hall sensor disposed on the bobbin to detect a magnetic force of the magnet, wherein the second Hall sensor may be electrically connected to the substrate through the elastic member and the lateral support member.

In another general aspect of the present invention, there is provided a camera module according to a modified example of the present invention, the camera module comprising: a bobbin, which has a through hole formed therein; a lens module, which is accommodated in the through hole, and is coupled to the bobbin; a recess formed to be recessed on an outer peripheral surface of the lens module; and a protrusion formed to protrude from an inner peripheral surface of the bobbin; wherein the recess comprises a first guide portion, which extends downwards from an upper end of the lens module, and a second guide portion, which extends so as to slope from the first guide portion.

In another general aspect of the present invention, there is provided an optical apparatus, the optical apparatus comprising: a main body; a camera module disposed at the main body to photograph an image of an object; and a display portion disposed at the main body to output the image photographed by the camera module; wherein the camera module may comprise: a bobbin, which has a through hole formed therein; a lens module, which is accommodated in the through hole, and is coupled to the bobbin; a recess formed to be recessed on an outer peripheral surface of the lens module; and a protrusion formed to protrude from an inner peripheral surface of the bobbin; wherein the recess comprises a first guide portion, which extends downwards from an upper end of the lens module, and a second guide portion, which extends so as to slope from the first guide portion.

In another general aspect of the present invention, there is provided a camera module, the camera module comprising: a lens module; a bobbin, which accommodates the lens module at an inner side thereof; a bobbin, which accommodates the lens module at an inner side thereof; a first coupled portion disposed at an outer peripheral surface of the lens module; and a second coupled portion disposed at an inner peripheral surface of the bobbin to move the first coupled portion therein, wherein the second coupled portion may include a first guide portion extended downwards from an upper end of the bobbin.

Preferably, but not necessarily, the second coupled portion may further include a second guide portion which extends so as to have a slope with the first guide portion at a bottom side end of the first guide portion.

Preferably, but not necessarily, the first guide portion may be extended from an upper end of the bobbin to an optical axis direction, wherein an angle formed by the first guide portion and the second guide portion may be a right angle.

Preferably, but not necessarily, the first coupled portion may include a protrusion, which protrudes from an outer peripheral surface of the lens module to an outside, and the second coupled portion may include a recess formed to be recessed from an inner peripheral surface of the bobbin to an outside.

Preferably, but not necessarily, the protrusion may include first and second lugs, each protruding from an outer peripheral surface of the lens module to an outside, wherein an imaginary line connecting the first and second lugs may pass a center of the lens module.

Preferably, but not necessarily, the recess may include a first groove in which the first lug moves, and a second groove in which the second lug moves, wherein a shape of the first groove may correspond to that of the second groove.

Preferably, but not necessarily, the bobbin may be disposed with an adhesive infusion hole extended from an upper end of the bobbin to the second guide portion, and an adhesive may be infused into the second guide portion through the adhesive infusion hole.

Preferably, but not necessarily, the adhesive may be epoxy hardened by UV rays or heat.

Preferably, but not necessarily, a length of the first coupled portion to an optical axis direction may be shorter than that of the second guide portion to an optical axis direction.

Preferably, but not necessarily, the first coupled portion may include a first lug protruding in the cubic shape from an outer peripheral surface of the lens module.

Preferably, but not necessarily, the lens module may take a cylindrical shape, and the bobbin may include, at an inner side, a through hole corresponding to the cylindrical shape of the lens module.

Preferably, but not necessarily, the first coupled portion may be disposed at an upper surface of the lens module.

Preferably, but not necessarily, an upper end of the bobbin may be disposed at an upper side over an upper end of the lens module when the first coupled portion is disposed at a distal end of the second coupled portion, and a bottom end of the bobbin may be disposed as a bottom side under a bottom end of the lens module.

Preferably, but not necessarily, a protruding length of the lug to an outside may be longer than a distance between an outer peripheral surface of the lens module and an inner peripheral surface of the bobbin.

In another exemplary embodiment of the present invention, there is provided a camera module, the camera module comprising: a lens module; a bobbin, which accommodates the lens module at an inner side thereof; a lug disposed at an outer peripheral surface of the lens module; a groove disposed at an inner peripheral surface of the bobbin; and an adhesive fixing the lug to the groove.

In another exemplary embodiment of the present invention, there is provided an optical apparatus, the optical apparatus comprising: a main body; a display portion disposed at one surface of the main body to display information; and a camera module disposed at the main body to photograph an image or a photograph, wherein the camera module includes: a lens module; a bobbin accommodating the lens module at an inside thereof; a first coupled portion disposed at an outer peripheral surface of the lens module; and a second coupled portion disposed at an inner peripheral surface of the bobbin to move the first coupled portion therein, wherein the second coupled portion may include a first guide portion extended downwards from an upper end of the bobbin.

In another exemplary embodiment of the present invention, there is provided a lens driving apparatus, the lens driving apparatus comprising: a bobbin disposed at an inside with at least one sheet of lens, and disposed at an outer peripheral surface with a first coil; a first magnet disposed at a surrounding of the bobbin in opposition to the first coil; a housing supporting the first magnet; a first lens driving unit including upper and bottom elastic members coupled to the bobbin and the housing to move the bobbin to a first direction parallel with an optical axis by interaction between the first magnet and the first coil; a base so disposed as to be spaced apart from the first lens driving unit at a predetermined distance; a plurality of support members movably supporting the housing relative to the base to second and third directions orthogonal to the first direction; a second coil disposed in opposition to the first magnet; a second lens driving unit including a circuit substrate arranged at one surface of the base by an adhesive member to move the housing to the second and third directions through an interaction between the first magnet and the second coil; a sensor holder disposed at one surface of the base to support the base; and an epoxy coated between the sensor holder and the base to support the base.

Preferably, but not necessarily, the sensor holder may include: a slope portion disposed at an outside surface of the sensor holder; and an epoxy accommodation portion disposed at one surface of the sensor holder to accommodate the epoxy.

Preferably, but not necessarily, the slope portion and the epoxy accommodation portion are spaced apart from the base at a predetermined distance.

Preferably, but not necessarily, the epoxy may include a first epoxy coated between the epoxy accommodation portion and the base, and a second epoxy coated between the slope portion and the base.

Preferably, but not necessarily, the first epoxy and the second epoxy may be formed with a same member.

Preferably, but not necessarily, the first epoxy and the second epoxy may be formed with mutually different members.

Preferably, but not necessarily, one surface of the epoxy accommodation portion may be recessed toward a downward direction.

Preferably, but not necessarily, one surface of the epoxy accommodation portion may include at least one staircase.

Preferably, but not necessarily, the epoxy accommodation portion may include, at one surface thereof, a plurality of lug accommodation portions so formed as to protrude upwards at a predetermined height.

Preferably, but not necessarily, the epoxy accommodation portion may include, at one surface thereof, a plurality of recess accommodation portions so formed as to recess at a predetermined height.

Preferably, but not necessarily, one surface of the slope portion may be recessed, or may include at least one staircase.

Preferably, but not necessarily, the slope portion may include a plurality of lug accommodation portions or recess accommodation portions to protrude or to recess at a predetermined height toward an upper surface thereof.

In another general aspect of the present invention, there is provided a camera module, the camera module comprising: a bobbin disposed at an inner side with at least one sheet of lens and at an outer peripheral surface with a first coil; a first magnet disposed at a surrounding of the bobbin in opposition to the first coil; a housing supporting the first magnet; upper and bottom elastic members coupled to the bobbin and the housing; a first lens driving unit moving the bobbin to a first direction parallel with an optical axis in response to an interaction between the first magnet and the first coil; a base so disposed as to be spaced apart from the first lens driving unit at a predetermined distance; a plurality of support members movably supporting the housing relative to the base to second and third directions orthogonal to the first direction; a second coil disposed in opposition to the first magnet; a circuit substrate disposed at one surface of the base by an adhesive member; a second lens driving unit moving the housing to the second and third directions in response to an interaction between the first magnet and the second coil; a sensor holder disposed at one surface of the base to support the base; an epoxy coated between the sensor holder and the base to inhibit the base from drooping; an image sensor; and a PCB (Printed Circuit Board) mounted with the image sensor.

Preferably, but not necessarily, the sensor holder may include a slope portion disposed at an outer peripheral surface of the sensor holder, and an epoxy accommodation portion disposed at one surface of the sensor holder to accommodate the epoxy.

Preferably, but not necessarily, the epoxy may include a first epoxy coated between the epoxy accommodation portion and the base, and a second epoxy coated between the slope portion and the base.

Preferably, but not necessarily, the epoxy accommodation portion may include a plurality of lug accommodation portions or recess accommodation portions to protrude or recess at a predetermined height toward an upper surface of the slope portion.

Preferably, but not necessarily, one surface of the epoxy accommodation portion may be recessed or include at least one staircase.

Preferably, but not necessarily, the slope portion may include a plurality of lug accommodation portions or recess accommodation portions to protrude or to recess at a predetermined height toward an upper surface of the slope portion.

Preferably, but not necessarily, one surface of the slope portion may be recessed or include at least one staircase.

Preferably, but not necessarily, the first epoxy and the second epoxy may be formed with mutually different members.

Advantageous Effects

Through the present invention, the lens module may be advantageously minimized in phenomenon in which defects in resolution caused by movement of lens module to the bobbin due to external shock are generated.

The lens driving apparatus according to an exemplary embodiment of the present invention and the camera module thereof may have advantageous effects in that off-focus between the lens barrel assembly and PCB caused by drooping of both sides at the lens barrel assembly can be inhibited to further enhance the quality of camera module.

BEST MODE

Figure 1:
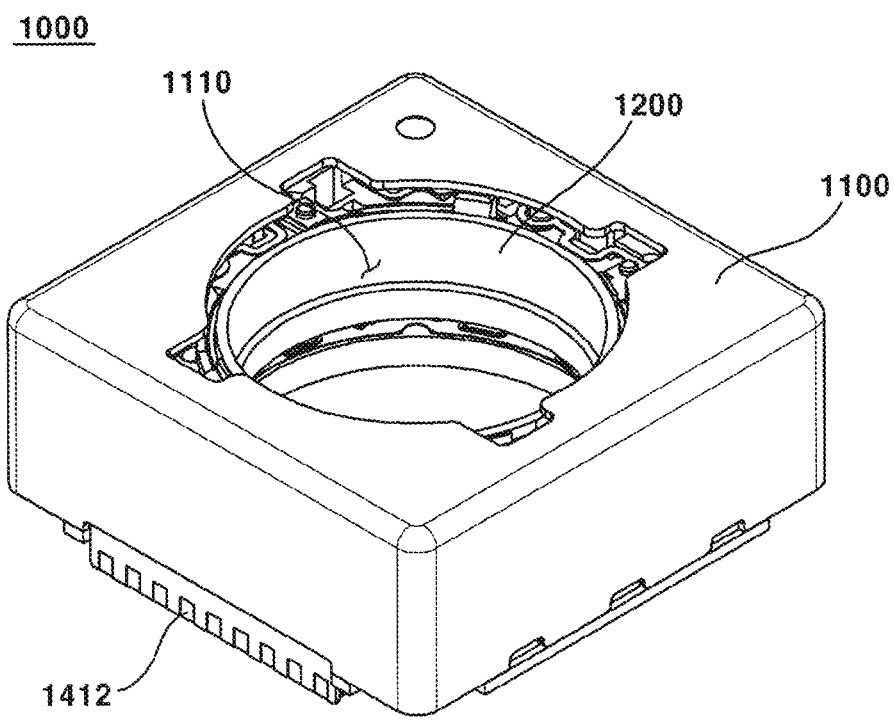
FIG. 1 is a perspective view illustrating a lens driving unit according to an exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter is defined as an optical axis direction of a lens module (1020) in a state of being coupled to a lens driving unit.

An "auto focus function" as used hereinafter is defined as a function of matching a focus relative to an object by adjusting a distance from an image sensor by moving to an optical axis direction a lens module in response to a distance to the object in order to obtain a clear image of the object on the image sensor. Meantime, the "auto focus" may be interchangeably used with "AF".

A "handshake correction function" as used hereinafter is defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

Now, a configuration of an optical apparatus according to an exemplary embodiment of the present invention will be described hereinafter.

The optical apparatus according to an exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus according to an exemplary embodiment of the present invention may include a main body (not shown), a camera module disposed on the main body to photograph an image of an object, and a display portion (not shown) disposed at the main body to output an image photographed by the camera module.

Hereinafter, configuration of optical apparatus according to an exemplary embodiment of the present invention will be described.

The camera module may further include a lens driving unit (1000), a lens module (1020), an infra Red cut-off filter (not shown), a PCB (not shown), an image sensor (not shown) and a controller (not shown).

The lens module (1020) may include one or more lenses (not shown) and a lens barrel accommodating one or more lenses. However, one element of the lens module (1020) is not limited by the lens module, and any holder structure capable of supporting one or more lenses will suffice. The lens module (1020) may move along with the lens driving unit (1000) by being coupled to the lens driving unit (1000). The lens module (1020) may be coupled to an inner side of the lens driving unit (1000), for example. Meantime, a light having passed the lens module (1020) may be irradiated on the image sensor. The lens module (1020) may take a cylindrical shape, and a bobbin (1210) may include, at an inner side, a lens coupling portion (1211), which is a through hole corresponding to the cylindrical shape of the lens module (1020).

The infrared cut-off filter (not shown) may serve to inhibit a light of infrared ray from entering the image sensor. The infrared cut-off filter may be interposed between the lens module (1020) and the image sensor, for example. The infrared cut-off filter may be mounted on a base (1500, described later), and may be coupled with a holder member (not shown). The infrared cut-off filter may be installed on a hollow hole (1510) formed at a center of the base (1500). The infrared cut-off filter may be formed with a film material or a glass material, for example. Meantime, the infrared cut-off filter may be formed by allowing an infrared cut-off coating material to be coated on an optical filter such as an imaging plane protection cover glass or a cover glass, for example.

The PCB may support the lens driving unit (1000). The PCB may be mounted with an image sensor. For example, an upper surface of the PCB may be disposed with the lens driving unit (1000), and an upper inner side of the PCB may be disposed with an image sensor. Furthermore, an upper external side of the PCB may be coupled by a sensor holder (not shown), and the sensor holder may be coupled thereon with the lens driving unit (1000). Through this structure, a light having passed the lens module (1020) accommodated inside the lens driving unit (1000) may be irradiated onto the image sensor mounted on the PCB. The PCB may supply an electric power to the lens driving unit (1000).

Meantime, the PCB may be disposed with a controller to control the lens driving unit (1000).

The image sensor may be mounted on the PCB. The image sensor may be so disposed as to match the lens module (1020) in terms of optical axis, through which the image sensor can obtain the light having passed the lens module (1020). The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on a PCB. The controller may be disposed at an external side of the lens driving unit (1000). However, the controller may be also disposed at an inner side of the lens driving unit (1000). The controller may control a direction, intensity and amplitude of current supplied to each element of lens driving unit (1000). The controller may perform any one of autofocusing function and handshake correction function of the camera module by controlling the lens driving unit (1000). That is, the controller may move the lens module (1020) to an optical axis direction or tile the lens module (1020) to a direction orthogonal to the optical axis direction by controlling the lens driving unit (1000). Furthermore, the controller may perform the feedback control of autofocus function and handshake correction function. To be more specific, the controller may control a power or a current applied to a first driving portion (1220) and/or a third driving portion (1420) by receiving a position of a second driving portion (1320) detected by a sensor portion (1700).

Hereinafter, configuration of lens driving unit will be described in detail with reference to the accompanying drawings.

Figure 2:
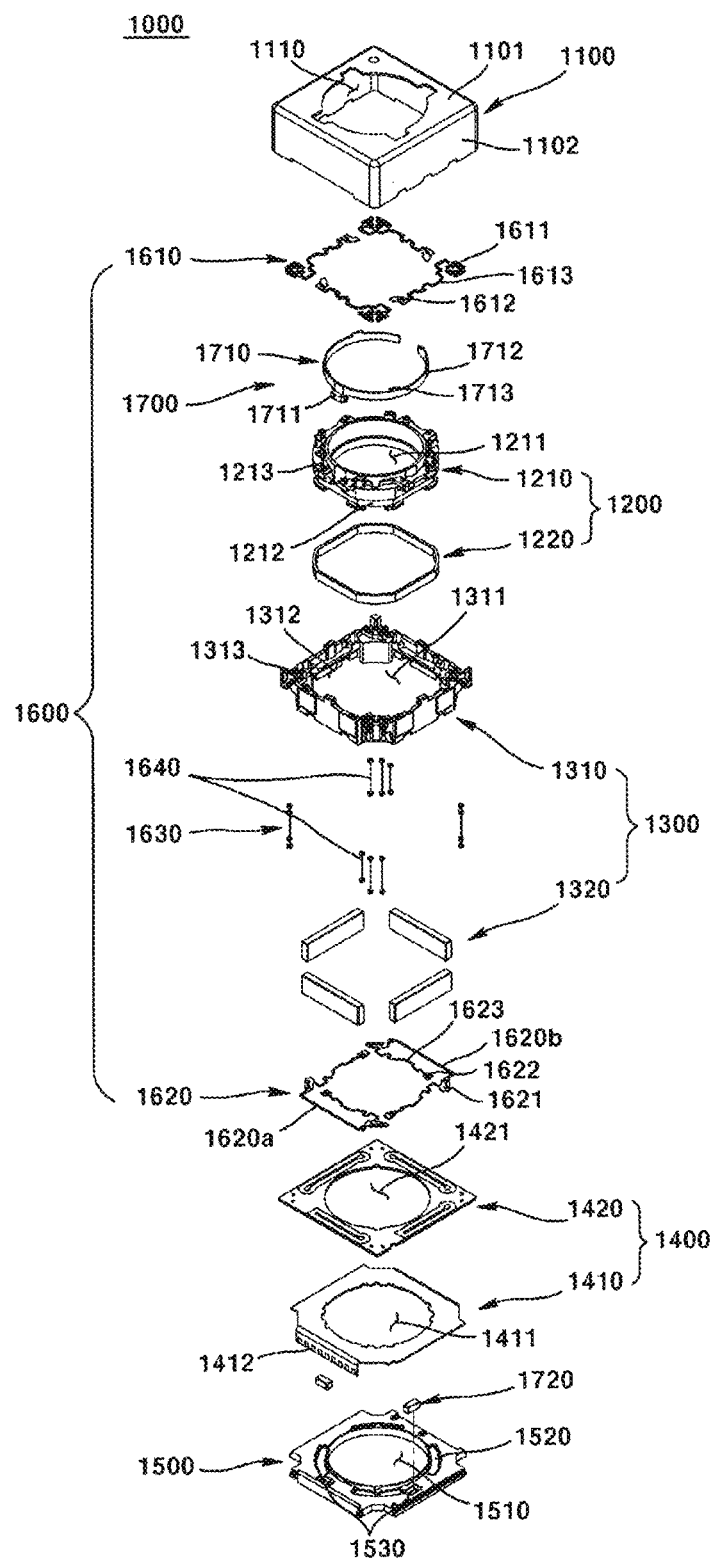
FIG. 2 is an exploded perspective view illustrating a lens driving unit according to an exemplary embodiment of the present invention.
Figure 3:
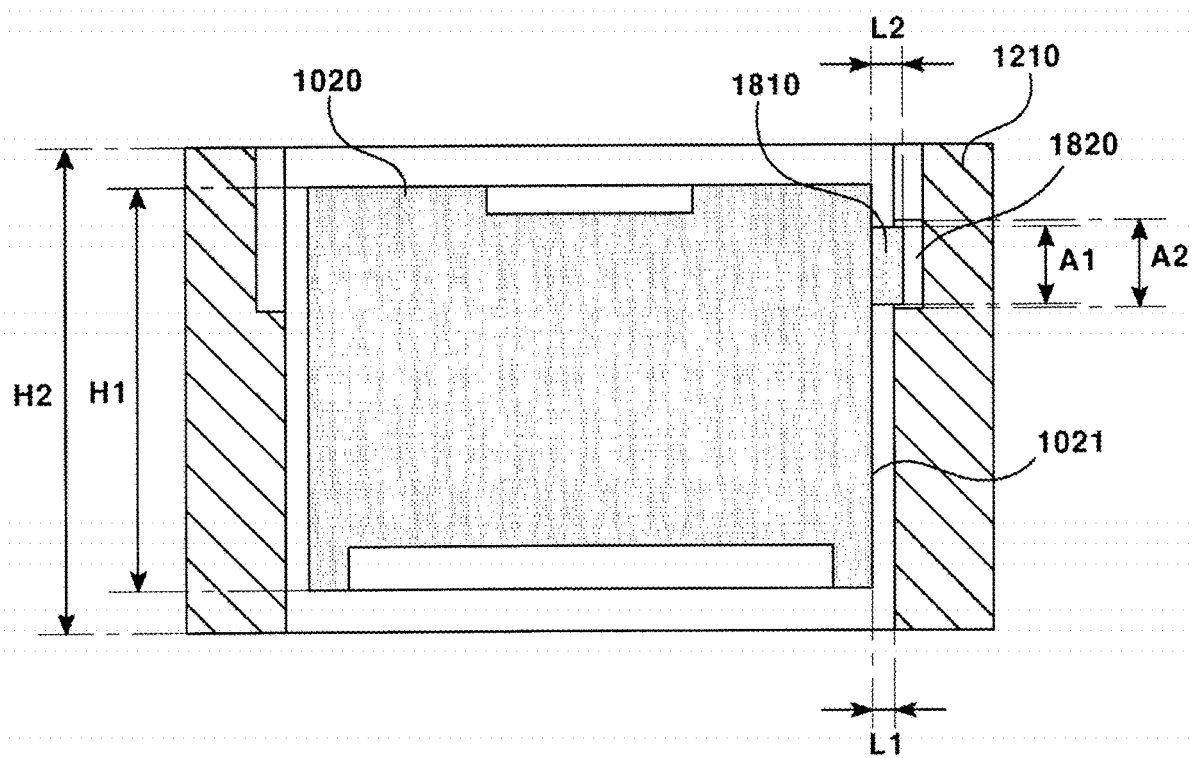
FIG. 3 is a cross-sectional view illustrating a coupled state between a lens module and a bobbin in a camera module according to an exemplary embodiment of the present invention.
Figure 4:
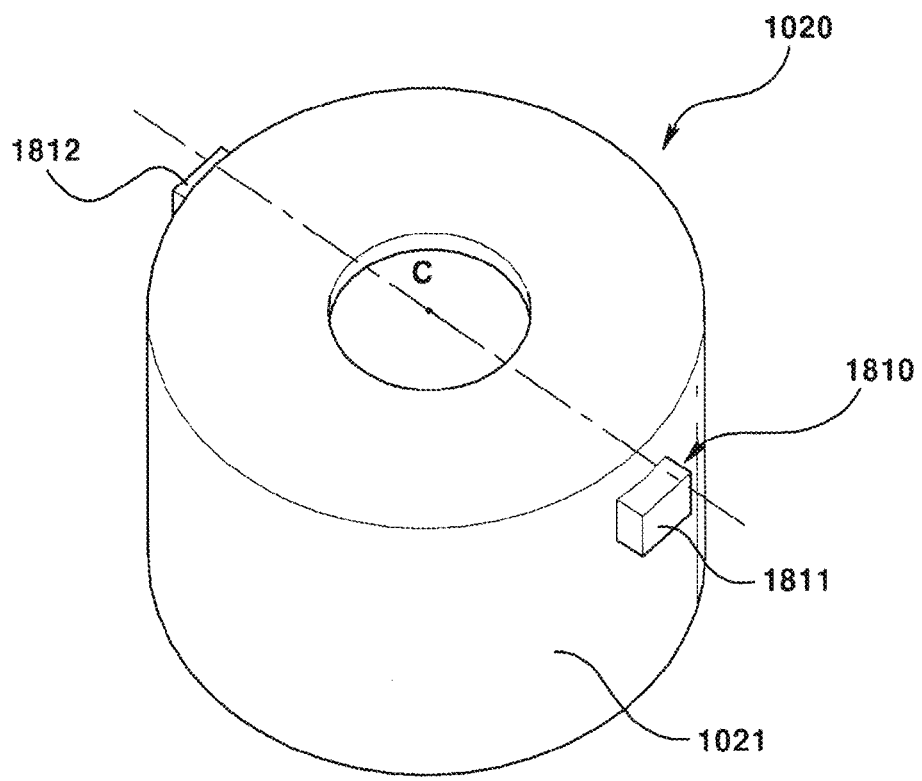
FIG. 4 is a perspective view illustrating a lens module of a camera module according to an exemplary embodiment of the present invention.
Figure 5:
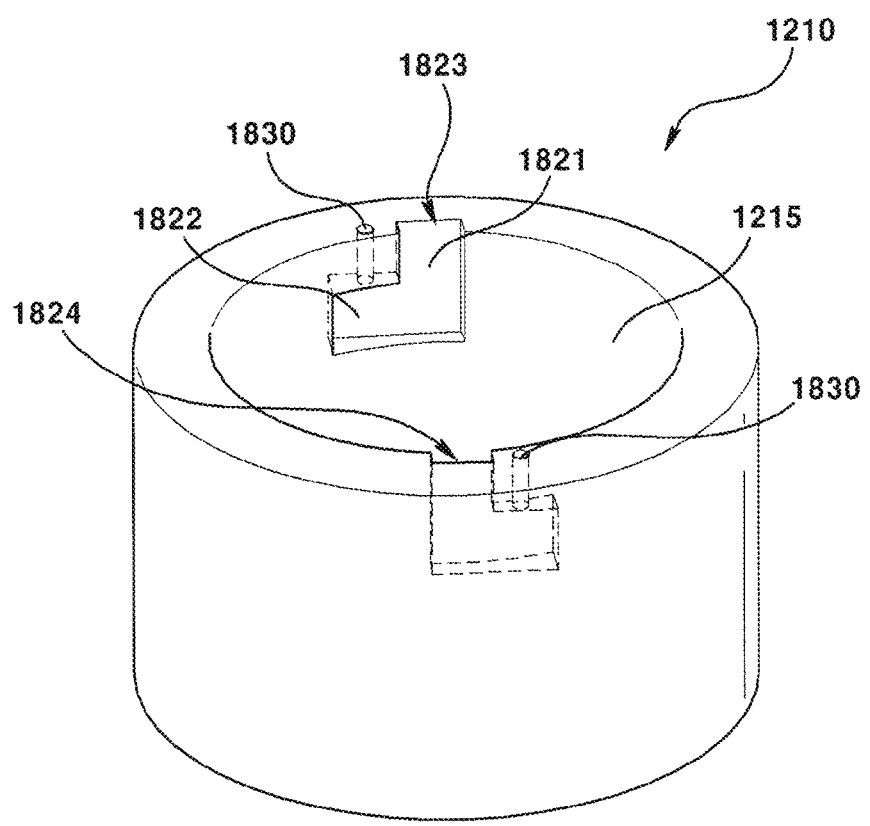
FIG. 5 is a perspective view illustrating a bobbin of a camera module according to an exemplary embodiment of the present invention.

FIG. 1 is a perspective view illustrating a lens driving unit according to an exemplary embodiment of the present invention, FIG. 2 is an exploded perspective view illustrating a lens driving unit according to an exemplary embodiment of the present invention, FIG. 3 is a cross-sectional view illustrating a coupled state between a lens module and a bobbin in a camera module according to an exemplary embodiment of the present invention, FIG. 4 is a perspective view illustrating a lens module of a camera module according to an exemplary embodiment of the present invention, and FIG. 5 is a perspective view illustrating a bobbin of a camera module according to an exemplary embodiment of the present invention.

Referring to FIGS. 1 to 5, the lens driving unit (1000) according to an exemplary embodiment of the present invention may include a cover member (1100), a first mover (1200), a second mover (1300), a stator (1400), a base (1500), a support member (1600) and a sensor portion (1700). However, the lens driving module (1000) according to an exemplary embodiment of the present invention may be omitted of any one of the cover member (1100), the first mover (1200), the second mover (1300), the stator (1400), the base (1500), the support member (1600) and the sensor portion (1700). Inter alia, the sensor portion (1700) may be omitted as an element for autofocus feedback function and/or handshake correction feedback function.

The cover member (1100) may form an exterior look of lens driving unit (1000). The cover member (1100) may take a bottom-opened cubic shape. However, the present invention is not limited thereto. The cover member (1100) may include an upper surface (1101) and a lateral surface (1102) extended downwards from an external side of the upper surface (1101). Meantime, a bottom end of the lateral surface (1102) at the cover member (1100) may be mounted to the base (1500). An inner space formed by the cover member (1100) and the base (1500) may be disposed with the first mover (1200), the second mover (1300), the stator (1400) and the support member (1600). Furthermore, the cover member (1100) may be mounted to the base (1500) by partially or totally adhered by an inner lateral surface to a lateral surface of the base (1500, described later), through which the cover member (1100) may have functions of protecting inner elements from external shocks and inhibiting foreign objects from entering the cover member.

The cover member (1100) may be formed with a metal material, for example. To be more specific, the cover member (1100) may be equipped with a metal plate. In this case, the cover member (1100) may inhibit radio interference. That is, the cover member (1100) may inhibit electric waves generated from outside of the lens driving unit (1000) from entering an inside of the cover member (1100). Furthermore, the cover member (1100) may inhibit the electric waves generated from inside of the cover member (1100) from being emitted to outside of the cover member (1100). However, the material of cover member (1100) is not limited thereto.

The cover member (1100) may include an opening (1110) exposing the lens module (1020) by being formed at an upper surface (1101). The opening (1110) may be formed in a shape corresponding to that of the lens module (1020). The size of opening (1110) may be formed greater than that of a diameter of the lens module (1020) to allow the lens module (1020) to be assembled through the opening (1110). Furthermore, a light introduced through the opening (1110) may pass through the lens module (1020). Meantime, the light having passed the lens module (1020) may be transmitted to the image sensor.

The first mover (1200) may include a bobbin (1210) and a first driving portion (1220). The first mover (1200) may be coupled to a lens module (1020), one of the constitutional elements of camera module {however, the lens module (1020) may be explained as one of the elements of the lens driving unit (1000)}. 0). That is, the lens module (1020) may be disposed at an inside of the first mover (1200). In other words, an inner peripheral surface of the first mover (1200) may be coupled by an outer peripheral surface of the lens module (1020). Meantime, the first mover may integrally move with the lens module (1020) through an interaction with the second mover (1300). That is, the first mover (1200) may move the lens module (1020).

The first mover (1200) may include a bobbin (1210). Furthermore, the first mover (1200) may include a first driving portion (1220) coupled to the bobbin (1210).

The bobbin (1210) may be coupled to the lens module (1020). To be more specific, an inner peripheral surface of the bobbin (1210) may be coupled by an outer peripheral surface of the lens module (1020). Meanwhile, the bobbin (1210) may be coupled by the first driving portion (1220). Furthermore, a bottom surface of bobbin (1210) may be coupled to a bottom support member (1620) and an upper surface of the bobbin (1210) may be coupled to an upper support member (1610). The bobbin (1210) may be disposed at an inside of the housing (1310). The bobbin (1210) may be relatively moved to an optical axis direction relative to the housing (1310). The bobbin (1210) may include a lens coupling portion (1211) formed thereinside. The lens coupling portion (1211) may be coupled by the lens module (1020).

The bobbin (1210) may include a first driving coupling portion (1212) wound or installed with the first driving portion (1220). The first driving coupling portion (1212) may be integrally formed with an external lateral surface of the bobbin (1210). Furthermore, the first driving coupling portion (1212) may be continuously formed along with the external lateral surface of the bobbin (1210) or spaced apart at a predetermined distance. The first driving coupling portion (1212) may include a recess formed by being recessed at one part of the external lateral surface of the bobbin (1210). The first driving coupling portion (1212) may be disposed with the first driving portion (1220), and the first driving portion disposed at the first driving coupling portion (1212) may be supported by the first driving coupling portion (1212).

The bobbin (1210) may include an upper coupling portion (1213) coupled with the upper support member (1610). The upper coupling portion (1213) may be coupled to an inner lateral portion (1612) of the upper support member (1610). For example, a lug (not shown) of the upper coupling portion (1213) may be coupled by being inserted into a groove or a hole (not shown) at the inner lateral portion (1612). Meantime, these elements may be coupled by allowing a lug to be disposed at the upper support member (1610) and by allowing a groove or a hole to be disposed on the bobbin (1210). Meantime, the bobbin (1210) may include a bottom coupling portion (not shown) coupled to the bottom support member (1620). The bottom coupling portion formed at a bottom of the bobbin (1210) may be coupled to an inner lateral portion (1620) of the bottom support member (1620). For example, a lug (not shown) at the bottom coupling portion may be coupled by being inserted into a groove or a hole (not shown) of the inner lateral portion (1622). Meanwhile, these elements may be coupled by allowing a lug to be disposed at the bottom support member (1620) and by allowing a groove or a hole to be disposed on the bobbin (1210).

The first driving portion (1220) may be disposed in opposition to the second driving portion (1320) of the second mover (1300). The first driving portion (1220) may move the bobbin (1210) relative to the housing (1310) through an electromagnetic interaction with the second driving portion (1320). The first driving portion (1220) may include a coil. The coil may be guided to the first driving coupling portion (1212) to be wound on an external lateral surface of the bobbin (1210). Furthermore, in another exemplary embodiment, the coil may be arranged at the external lateral surface of the bobbin (1210) by allowing four coils to be independently disposed to form a 90° between adjacent two coils. When the first driving portion (1220) includes a coil, an electric power supplied to the coil may be supplied through the bottom support member (1620). At this time, the bottom support member (1620) may be divisively disposed into a pair for power supply to the coil. Meanwhile, the first driving portion (1220) may include a pair of lead cables for power supply. In this case, each of the pair of lead cables on the first driving portion (1220) may be electrically coupled to each of a pair of bottom support members (1620). Meantime, when a power is supplied to the coil, an electromagnetic field may be generated about the coil. Furthermore, in another exemplary embodiment, the first driving portion (1220) may include a magnet. In this case, the second driving portion (1320) may be disposed with a coil.

The second mover (1300) may be disposed in opposition to the first mover (1200) at an external side of the first mover (1200). The second mover (1300) may be supported by the base (1500) disposed thereunder. The second mover (1300) may be disposed at an inner side space of the cover member (1100).

The second mover (1300) may include a housing (13100) disposed at an external side of the bobbin (1210). Furthermore, the second mover (1300) may include a second driving portion (1320) fixed to the housing (1310) by being disposed in opposition to the first driving portion (1220).

The housing (1310) may be formed in a shape corresponding to an inner lateral surface of the cover member (1100) forming an external look of the lens driving unit (1000), but may be formed in any shape that may be disposed at an inside of the cover member (1100). At least a part of the housing (1310) may be formed in a shape corresponding to an upper surface of the cover member (1100). At least a part of the housing (1310) may be formed in a shape corresponding to a lateral surface of the cover member (1100). The housing (1310) may be a four lateral surface-included cubic shape, for example. However, the shape of the housing (1310) is not limited thereto.

The housing (1310) may be formed with an insulation material, and may be formed in an injection-molded article in consideration of productivity. The housing (1310) is a part moving for OIS driving, and may be arranged by being spaced apart from the cover member (1100) at a predetermined distance. However, the housing (1310) may be fixed on the base (1500) in an AF model. Alternatively, in the AF model, the housing (1310) may be omitted, and a magnet formed by the second driving portion (1320) may be fixed to the cover member (1100).

The housing (1310) is upper/bottom side-opened to movably accommodate the first mover (1200) to a vertical direction. The housing (1310) may include, at an inner side, an upper/bottom opened inner space (1311). The inner space (1311) may be movably disposed with the first mover (1200). That is, the inner space (1311) may be formed in a shape corresponding to that of the first mover (1200). Furthermore, an outer peripheral surface of the inner space (1311) may be spaced apart from an outer peripheral surface of the first mover (1200).

The housing (1310) may include, at a lateral surface, a second driving portion coupling portion (1312) that accommodates the second driving portion (1320) by being formed in a shape corresponding to that of second driving portion (1320). That is, the second driving coupling portion (1312) may fix the second driving portion (1320) by accommodating the second driving portion (1320). The second driving portion (1320) may be fixed to the second driving coupling portion (1312) by an adhesive (not shown). Meantime, the second driving coupling portion (1312) may be disposed at an inner peripheral surface of the housing (1310). In this case, there is an advantageous strength to the electromagnetic interaction with the first driving portion (1220) disposed at an inside of the second driving portion. Furthermore, the second driving coupling portion (1312) may take a bottom-opened shape, for example. In this case, there is an advantageous strength to the electromagnetic interaction between the third driving portion (1420) disposed at a bottom side of the second driving portion (1320) and the second driving portion (1320). The second driving coupling portion (1312) may be formed in four pieces, for example. Each of the second driving coupling portion (1312) may be coupled by each of the second driving portion (1320).

The housing (1310) may be coupled at an upper surface with an upper support member (1610), and may be coupled at a bottom surface with a bottom support member (1620). The housing (1310) may include an upper side coupling portion (1313) coupled to the upper support member (1610). The upper side coupling portion (1313) may be coupled to an external portion (1611) of the upper support member (1610). For example, the upper side coupling portion (1313) formed in a lug may be coupled to a groove or a hole of the external portion (1611) by being inserted thereinto. Meantime, in another exemplary embodiment, the upper support member (1610) may be formed with a lug, and the housing (1310) may be formed with a groove or a hole, and the lug may be coupled into the groove or the hole. Meantime, the housing (1310) may include a bottom coupling portion (not shown) coupled to the bottom support member (1620). The bottom coupling portion formed at a bottom surface of the housing (1310) may be coupled to an external portion (1621) of the bottom support member (1620). For example, the bottom coupling portion formed in a lug may be coupled and inserted into a groove or a hole of the external portion (1621).

The second driving portion (1320) may be disposed in opposition to the first driving portion (1220) of the first mover (1200). The second driving portion (1320) may move the first driving portion (1220) through an electromagnetic interaction with the first driving portion (1220). The second driving portion (1320) may include a magnet. The magnet may be fixed to the second driving coupling portion (1312) of the housing (1310). The second driving portion (1320) may be disposed at the housing (1310) in such a fashion that four magnets are independently disposed, and two adjacent magnets form a right angle of 90° as illustrated in FIG. 4, for example. That is, the second driving portion (1320) can promote an efficient use of inner volume by being installed on four lateral surfaces of the housing (1310) each at a predetermined interval. Furthermore, the second driving portion (1320) may be attached to the housing (1310), but the present invention is not limited thereto. Meantime, the first driving portion (1220) may include a magnet, and the second driving portion (1320) may include a coil.

The stator (1400) may be disposed in opposition to a bottom side of the second mover (1300). Meantime, the stator (1400) can move the second mover (1300). Furthermore, the stator (1400) may be centrally disposed with through holes (1411, 421) corresponding to the lens module (1020).

The stator (1400) may include a circuit substrate (1410) interposed between the third driving portion (1420) and the base (1500). Furthermore, the stator (1400) may include a third driving portion (1420) oppositely disposed at a bottom side of the second driving portion (1320).

The circuit substrate (1410) may include a flexible circuit substrate of FPCB (Flexible Printed Circuit Board). The circuit substrate (1410) may be interposed between the third driving portion (1420) and the base (1500). Meantime, the circuit substrate (1410) can supply an electric power to the third driving portion (1420). Furthermore, the circuit substrate (1410) may supply the electric power to the first driving portion (1220) through a lateral support member (1630), an upper support member (1610), a conductive member (1640) and a bottom support member (1620). The circuit substrate (1410) may be disposed with a through hole (1411) to pass a light having passed the lens module (1020). Furthermore, the circuit substrate (1410) may include a terminal portion (1412) exposed to an outside by being bent. The terminal portion (1412) may be connected to an outside power, through which the electric power can be supplied to the circuit substrate (1410).

The third driving portion (1420) may include a coil. When an electric power is applied to the coil of the third driving portion (1420), the second driving portion (1320) and the housing (1310) fixed by the second driving portion (1320) may be integrally moved through interaction with the second driving portion (1320). The third driving portion (1420) may be mounted on the circuit substrate (1410) or electrically connected thereto. Meantime, the third driving portion (1420) may be formed with a through hole (1421) to pass a light of the lens module (1020). Furthermore, in consideration of miniaturization (reduced height to z axis direction which is an optical axis direction) of the lens driving unit (1000), the third driving portion (1420) may be formed with an FP (Fine Pattern) coil to be arranged or mounted on the circuit substrate (1410). The third driving portion (1420) may be an FP coil portion. The third driving portion (1420) may be formed by the FP coil being patterned on a substrate.

The base (1500) may support the second mover (1300). A bottom side of the base (1500) may be disposed with a PCB. The base (1500) may include a through hole (1510) formed at a position corresponding to that of the lens coupling portion (1211) of the bobbin (1210). The base (1500) may perform a function of the sensor holder protecting the image sensor. Meantime, the base (1500) may be disposed with an infrared ray filter. The through hole (1510) of the base (1500) may be coupled with the infrared ray filter. Alternatively, the infrared ray filter may be coupled to a separate sensor holder disposed at a bottom surface of the base (1500).

The base (1500) may include a foreign object collection portion (1520) collecting foreign objects introduced into the cover member (1100), for example. The foreign object collection portion (1520) may be disposed at an upper surface of the base (1500), and include an adhesive material to collect foreign objects at an inside space formed by the cover member (1100) and the base (1500). The base (1500) may include a sensor mounting portion (1530) coupled by the second sensor portion (1720). That is, the second sensor portion (1720) may be mounted on the sensor mounting portion (1530). At this time, the second sensor portion (1720) may detect the second driving portion (1320) coupled to the housing (1310) to detect a horizontal movement of the housing (1310). The sensor mounting portion (1530) may be disposed with two pieces, for example. Each of the two sensor mounting portions (1530) may be disposed with a second sensor portion (1720). In this case, the second sensor portion (1720) may be so disposed as to detect all the movements of x axis and y axis at the housing.

The support member (1600) may connect more than any two of the first mover (1200), the second mover (1300) and the base (1500). The support member (1600) may elastically connect more than any two of the first mover (1200), the second mover (1300) and the base (1500) to enable a relative movement at each element. That is, the support member (1600) may be formed with elastic member. The support member (1600) may include an upper support member (1610), a bottom support member (1620), a lateral support member (1630) and a conductive member (1640), for example. However, the conductive member (1640) is disposed to electrically connect the upper support member (1610) and the bottom support member (1620), and may be explained by being discerned from the upper support member (1610), the bottom support member (1620) and the lateral support member (1630).

The upper support member (1610) may include an external portion (1611), an internal portion (1612) and a connection portion (1613), for example. The upper support member (1610) may include an external portion (1611) coupled to the housing (1310), an internal portion (1612) coupled to the bobbin (1210) and a connection portion (1613) elastically connecting the external portion (1611) and the internal portion (1612).

The upper support member (1610) may be connected to an upper surface of the first mover (1200) and an upper surface of the second mover (1300). To be more specific, the upper support member (1610) may be coupled to an upper surface of the bobbin (1210) and an upper surface of the housing (1310). The internal portion of the upper support member (1610) may be coupled to an upper coupling portion (1213) of the bobbin (1210), and the external portion (1611) of the upper support member (1610) may be coupled to an upper coupling portion (1313) of the housing (1310).

The upper support member (1610) may be disposed by being divided into six pieces, for example. At this time, two pieces in the six upper support members (1610) may be electrically conducted to the bottom support member (1620) to apply an electric power to the first driving portion (1220). Each of two pieces in the six upper support members (1610) may be electrically connected to each of a pair of bottom support members (1620a, 1620b) through the conductive member (1640). Meantime, the remaining four upper support members in the six upper support members (1610) may be used to supply an electric power to a second sensor portion (1720), and to transmit/receive information or signals between a controller and the second sensor portion (1720). Furthermore, as a modified example, two upper support members in the six upper members (1610) may be directly connected to the first driving portion (1220), and the remaining four upper support members may be connected to the second sensor portion (1720).

The bottom support member (1620) may include a pair of bottom support members (1620a, 1620b), for example. That is, the bottom support member (1620) may include a first bottom support member (1620a) and a second bottom support member (1620b). Each of the first bottom support member (1620a) and the second bottom support member (1620b) may be supplied with an electric power by being respectively connected to a pair of lead cables of the first driving portion (1220) formed with a coil. Meantime, the pair of bottom support members (1620) may be electrically connected to the circuit substrate. Through this configuration, the pair of bottom support members (1620) may provide the electric power supplied from the circuit substrate to the first driving portion (1220).

The bottom support member (1620) may include an external portion (1621), an internal portion (1622) and a connection portion (1623), for example. The bottom support member (1620) may include an external portion (1621) coupled to the housing (1310), an internal portion (1622) coupled to the bobbin (1210) and a connection portion (1623) elastically connecting the external portion (1621) and the internal portion (1622).

The bottom support member (1620) may be connected to a bottom surface of the first mover (1200) and a bottom surface of the second mover (1300). To be more specific, the bottom support member (1620) may be coupled to a bottom surface of the bobbin (1210) and a bottom surface of the housing (1310). The internal portion (1622) of the bottom support member (1620) may be coupled to a bottom coupling portion of the bobbin (1210), and the external portion (1621) of the bottom support member (1620) may be coupled to a bottom coupling portion of the housing (1310).

The lateral support member (1630) may be fixed at one end to the stator (1400) or the base (1500), and coupled at the other end to the upper support member (1610) or the second mover (1300). The lateral support member (1630) may be coupled at one side to the base (1500) and coupled at the other side to the second mover (1300), for example. In another exemplary embodiment, the lateral support member (1630) may be coupled at one side to the stator (1400), and coupled at the other side to the upper support member (1610), whereby the lateral support member (1630) may elastically support the second mover (1300) to allow the second mover (1300) to horizontally move or to tilt.

The lateral support member (1630) may be formed in the same number as that of the upper support member (1610), for example. That is, the lateral support member (1630) may be formed in 6 pieces to be respectively connected to 6-piece upper support member (1610). In this case, the lateral support member (1630) can supply an electric power supplied from the stator (1400) or from outside to each piece of upper support member (1610). The lateral support member (1630) may be determined in the number of pieces in consideration of symmetry, for example. The lateral support member (1630) may be formed in the total number of 8, 2 pieces each to a corner of housing (1310), for example.

The lateral support member (1630) or the upper support member (1610) may include a configuration for shock absorption, for example. The configuration for shock absorption may be formed on at least any one of the lateral support member (1630) and the upper support member (1610). The configuration for shock absorption may be a separate member like a damper. Furthermore, the configuration for shock absorption may be realized through shape change on any one part of the lateral support member (1630) and the upper support member (1610).

The conductive member (1640) may electrically connect the upper support member (1610) and the bottom support member (1620). The conductive member (1640) may be separably formed from the lateral support member (1630). Electricity supplied to the upper support member (1610) through the conductive member (1640) may be supplied to the bottom support member (1620), and may be supplied to the first driving portion (1220) through the bottom support member (1620). Meantime, as a modification, when the upper support member (1610) is directly connected to the first driving portion (1220), the conductive member (1640) may be omitted.

The sensor portion (1700) may be used for at least any one of AF feedback and OIS feedback. That is, the sensor portion (1700) may detect positons or movements of at least any one of the first mover (1200) and the second mover (1300). The sensor portion (1700) may include a first sensor portion (1710) and a second sensor portion (1720), for example. The first sensor portion (1710) may provide information for AF feedback by sensing a relative vertical movement of the bobbin (1210) relative to the housing (1310). The second sensor portion (1720) may provide information for OIS feedback by detecting the horizontal direction movement and tilt of the second mover (1300).

The first sensor portion (1710) may be disposed at the first mover (1200). The first sensor portion (1710) may be disposed at the bobbin (1210). The first sensor portion (1710) may be fixed by being inserted into the first driving coupling portion (1212) formed at an outer peripheral surface of bobbin (1210). The first sensor portion (1710) may include a first sensor (1711), a flexible PCB (1712) and a terminal portion (1713).

The first sensor (1711) may detect movement or positon of the bobbin (1210). Alternatively, the first sensor (1711) may detect a positon of the second driving portion (1320) mounted on the housing (1310). The first sensor (1711) may be a Hall sensor, for example. The first sensor (1711) may detect a relative position change between the bobbin (1210) and the housing (1310) by detecting a magnetic force generated from the second driving portion (1320).

The flexible PCB (1712) may be mounted with the first sensor (1711). The flexible PCB (1712) may be formed with a strip shape, for example. At least one portion of the flexible PCB (1712) may be inserted into a sensor guide groove (not shown) by being formed in a shape corresponding to that of the sensor guide groove formed to be recessed at an upper surface of the bobbin (1210). The flexible PCB (1712) may be an FPCB, for example. That is, the flexible PCB (1712) may be bent in order to correspond to a shape of the sensor guide groove by being formed in a flexible manner. The flexible PCB (1712) may be formed with a terminal portion (1713).

The terminal portion (1713) may supply electricity to the first sensor (1711) through the flexible PCB (1712) by receiving the electricity. Furthermore, the terminal portion (1713) may receive a control command relative to the first sensor (1711) or transmit a value sensed from the first sensor (1711). The terminal portion (1713) may be formed in the number of 4, for example, to be electrically connected to the upper support member (1610). In this case, two terminal portions (1713) may be used to receive electricity from the upper support member (1610) and the remaining two terminal portions (1713) may be used to transmit/receive information or a signal.

The second sensor portion (1720) may be disposed at the stator (1400). The second sensor portion (1720) may be disposed at an upper surface or a bottom surface of circuit substrate (1410). The second sensor portion (1720) may be disposed at a sensor mounting portion (1530) formed at the base (1500) by being disposed at a bottom surface of the circuit substrate (1410), for example. The second sensor portion (1720) may include a Hall sensor, for example. In this case, the second sensor portion (1720) may sense the magnetic field of the second driving portion (1320) to sense a relative movement of the second mover (1300) relative to the stator (1400). The second sensor portion (1720) may be formed in the number of 2 or more to detect both the x axis and y axis movements, for example.

The camera module according to an exemplary embodiment may further comprise a first coupling portion (1810), a second coupling portion (1820) and an adhesive infusion hole (1830). However, at least any one of the first coupling portion (1810), the second coupling portion (1820) and the adhesive infusion hole (1830) may be omitted in the camera module according to an exemplary embodiment of the present invention.

The first coupling portion (1810) may be disposed at an outer peripheral surface (1021) of the lens module (1020). The first coupling portion (1810) may move along with the second coupling portion (1820). Any one of the first coupling portion (1810) and the second coupling portion (1820) may include a protrusion, and any one of the first coupling portion (1810) and the second coupling portion (1820) may include a groove, whereby the first coupling portion (1810) may be moved by being guided to the second coupling portion (1820).

The first coupling portion (1810) may be disposed at an upper surface of the lens module (1020). The lens module (1020) may be coupled to an inner side of the bobbin (1210) by being inserted through an opening (1110) of cover member (1100) at the assembly-finished lens driving unit (1000). Thus, when the first coupling portion (1810) is disposed at an upper surface of the lens module (1020), and when the epoxy is coated from an upper surface of the lens module (1020), visibility of operator can be improved. Furthermore, as a modification, the first coupling portion (1810) may be disposed at a bottom surface of the lens module (1020), and in this case, it is advantageous for the epoxy to be coated from a bottom surface of the lens module (1020). Furthermore, the direction in which the lens module (1020) is couple to the bobbin (1210) may be from an upper surface or from a bottom surface. That is, the direction may be any direction.

The first coupling portion (1810) may be adhered to the second coupling portion (1820) by an adhesive (not shown). At this time, the adhesive may be an epoxy hardened by UV rays or heat. The adhesive may be infused into between the first coupling portion (1810) and the second coupling portion (1820) through the adhesive infusion hole (1830).

The first coupling portion (1810) may include protrusions (1811, 1812) protruding from an outer peripheral surface of the lens module (1020) to an outside. At this time, the protrusions (1811, 1812) may include a first protrusion (1811) and a second protrusion (1812), for example. Furthermore, the protrusions (1811, 1812) may include one or more than three protrusions, as a modification.

The protrusions (1811, 1812) may include a first protrusion (1811) and a second protrusion (1812) protruded from an outer peripheral surface (1021) of the lens module (1020) to an outside. An imaginary line connecting the first protrusion (1811) and the second protrusion (1812) may pass a center (see C of FIG. 4) of the lens module (1020). That is, the first protrusion (1811) and the second protrusion (1812) may be disposed at a side opposite from the lens module (1020). Meantime, the first protrusion (1811) and the second protrusion (1812) may be formed in a mutually corresponding shape. The first protrusion (1811) and the second protrusion (1812) may take a cubic shape. However, the present invention is not limited thereto.

A protruded length (L1) of the first and second protrusions (1811,1812) to an outside may be longer than a distance (L2) between an outer circumferential surface (1021) of the lens module (1020) and an inner circumferential surface (1215) of bobbin (1210). Because of that, a relative movement to the bobbin (1210) at the lens module (1020) can be limited while the protrusions (1811, 1812) are in an inserted state into recesses (1823, 1824).

The second coupling portion (1820) may be disposed at an inner circumferential surface (1215) of bobbin (1210).

The first coupling portion (1810) may be moved inside the second coupling portion (1820). That is, the second coupling portion (1820) may guide the movement of the first coupling portion (1810). Furthermore, the second coupling portion (1820) can minimize the phenomenon of the lens module (1020) moving relative to the bobbin (1210) by the external shock by limiting the moving direction of the first coupling portion (1810).

The second coupling portion (1820) may include a first guide portion (1821) and a second guide portion (1822). The second coupling portion (1820) may include a second guide portion (1822) so extended from a bottom end of the first guide portion (1821) as to slope against the first guide portion (1821).

The first guide portion (1821) may be extended from an upper end of the first guide portion (1821) to an optical axis direction, through which the first coupling portion (1810) of the lens module (1020) coupled from an upper side of the bobbin (1210) to a bottom side may be inserted into the first guide portion (1821). The first guide portion (1821) may be extended from an upper end of the bobbin (1210) directly to a bottom direction, for example. A width of the first guide portion (1821) may correspond to that of the protrusions (1811, 1812). An upper end of the first guide portion (1821), that is, an inlet, may be provided with a guide structure to allow an easy insertion of the protrusions (1811, 1812).

The second guide portion (1822) may be so extended at a bottom end of the first guide portion (1821) as to slope against the first guide portion (1821). Alternatively, the second guide portion (1822) may take a shape of being bent from the first guide portion (1821). Through this structure, the protrusions (1811, 1812) that have moved along the first guide portion (1821) can move to the second guide portion (1822). Meantime, the second guide portion (1822) may be extended at a bottom end of the first guide portion (1821) as much as a predetermined distance. or example, the protrusions (1811, 1812) may be fixed by adhesive at a distal end or its vicinity of the second guide portion (1822).

Alternatively, an angle formed by the first guide portion (1821) and the second guide portion (1822) may be a right angle. That is, the first guide portion (1821) and the second guide portion (1822) may form a "∟" shape. However, the present invention is not limited thereto, and the angle formed by the first guide portion (1821) and the second guide portion (1822) may be an acute angle or an obtuse angle.

The second coupling portion (1820) may include recesses (1823, 1824) to be recessed to an outside from an inner circumferential surface (1215) of bobbin (1210). The recesses (1823, 1824) may include a first groove (1823) in which the first protrusion (1811) moves. The recesses (1823, 1824) may include a second groove (1824) in which the second protrusion (1812) moves. The first recess and the second recess (1823, 1824) may have a mutually corresponding shape. Alternatively, the first recess and the second recess (1823, 1824) may have a shape each corresponding to that of the first protrusion (1811) and the second protrusion (1812). In this case, the first recess (1823) can accommodate the first protrusion (1811) and the second recess (1824) can accommodate the second protrusion, whereby it is easy to assemble the lens module (1020) on the bobbin (1210).

The adhesive infusion hole (1830) may be extended from an upper end of the bobbin (1210) to the second guide portion (1822). The adhesive may be infused to the second guide portion (1822) through the adhesive infusion hole (1830). The adhesive infused to the adhesive infusion hole (1830) may be infused between a first coupling portion (1810) and a second coupling portion (1820). At this time, the adhesive (not shown) may be epoxy cured or hardened by UV rays or heat, whereby the lens module (1020) can be placed at a right position of the bobbin (1210) and the adhesive can be cured or hardened by irradiating the UV rays or heat. The optical axis of lens module (1020) and the optical axis of image sensor can be also aligned using the adhesive. However, the image sensor can be also coupled while the lens module (1020) is coupled to the lens driving unit (1000).

An optical axis direction length (A1) of the first coupling portion (1810) may be shorter than an optical axis direction length (A2) of the second guide portion (1822), whereby a space may be provided between the first coupling portion (1810) and the second guide portion (1822), and the adhesive may be infused in the said space.

When the first coupling portion (1810) is disposed at a bottom surface of a distal end of the second coupling portion (1820), the upper end of the bobbin (1210) may be disposed at an upper side over an upper end of the lens module (1020), and a bottom end of the bobbin (1210) may be disposed at a farther bottom side than a bottom end of the lens module (1020). That is, an optical axis direction height (H2) of bobbin (1210) may be greater than an optical axis direction height (H1) of the lens module (1020). However, when the first coupling portion (1810) is disposed at a bottom surface or a distal end of the second coupling portion (1820), an upper end of bobbin (1210) may be disposed at a bottom side over an upper end of the lens module (1020). Furthermore, a bottom end of bobbin (1210) may be disposed at an upper side over a bottom end of the lens module (1020). Furthermore, an optical axis direction height of the lens module (1020) may be greater than an optical axis direction height of bobbin (1210).

Hereinafter, the operation and effects of camera module according to exemplary embodiments of the present invention will be described in detail with reference to the accompanying drawings.

First, an AF function of camera module according to an exemplary embodiment will be described.

When electricity is supplied to a coil-equipped first driving portion (1220), the first driving portion (1220) may perform a movement to the second driving portion (1320) in response to electromagnetic interaction of the second driving portion (1320) formed with the first driving portion (1220) and a magnet. At this time, the bobbin (1210) coupled by the first driving portion (1220) may integrally move with the first driving portion (1220). That is, the bobbin (1210) coupled to an inner side of the lens module (1020) may vertically move relative to the housing (1310). The movement of bobbin (1210) is to resultantly allow the lens module (1020) to move closer to or to be distanced from the image sensor, whereby the focus adjustment to an object can be performed.

Meantime, an AF feedback may be applied in order to realize an AF function of camera module according to an embodiment of the present invention. The first sensor (1711) mounted with the bobbin (1210) and formed with a Hall sensor may detect a magnetic field of second mover (1320) formed with a magnet fixed to the housing (1310). Meanwhile, when the bobbin (1210) performs a relative movement to the housing (1310), the amount of magnetic field detected from the first sensor may be changed. The first sensor (1711) may detect a movement to z axis direction or positon of bobbin (1210) by the abovementioned method and transmit the detected value to a controller. The controller may determine whether to perform an additional movement relative to the bobbin (1210) through the received detected value. This process is generated in real time, such that the autofocus function according to the exemplary embodiment of the present invention can be more accurately implemented through the autofocus feedback.

Now, handshake correction function, i.e., "OIS (Optical Image Stabilization)" of camera module according to an exemplary embodiment of the present invention will be described.

When electricity is supplied to a third driving portion (1420), the second driving portion (1320) may perform a movement to the third driving portion (1420) in response to electromagnetic interaction of the second driving portion (1320) formed with the third driving portion (1420) and a magnet. At this time, the housing (1310) coupled by the second driving portion (1320) may integrally move with the second driving portion (1320). That is, the housing (1310) may horizontally move relative to the base (1500). Meanwhile, at this time the housing (1310) may be induced with a tilt relative to the base (1500). The said movement of housing (1310) may result in the lens module (1020) to a direction parallel with a direction of image sensor relative to the image sensor, whereby the OIS function can be implemented.

Meantime, the OIS feedback may be applied in order to more accurately realize the OIS function of the camera module.

A pair of second sensor portions (1720) mounted on the base (1500) and formed in a Hall sensor may detect a magnetic field of the second driving portion (1320) formed in a magnet fixed to the housing (1310). Meantime, when the housing (1310) performs a relative movement to the base (1500), the amount of magnetic field detected by the second sensor portion (1720) may be changed. The pair of second sensor portions (1720) may detect the amount of movement or the position of horizontal direction (x axis and y axis) at the housing (1310) by this method and transmit the detected value to the controller. The controller may determine whether to perform an additional movement relative to the housing (1310) through the received detected value. This process is generated in real time, such that the OIS function of camera module according to the exemplary embodiment of the present invention can be more accurately implemented through the OIS feedback.

Hereinafter, processes of a lens module being coupled to a bobbin at a camera module according to an exemplary embodiment will be described.

First, the lens driving unit (1000) in an assembly-finished state may be prepared. The lens module (1020) may be inserted into an inside of the lens driving unit (1000) through an opening (1110) formed at an upper surface (1101) of cover member (1100) at the lens driving unit (1000). In this process, the first protrusion (1811) disposed at an outer circumferential surface (1021) of the lens module (1020) may be inserted into the first groove (1823) formed at an inner circumferential surface (1215) of bobbin (1210), and the second protrusion (1812) of lens module (1020) may be inserted into the second groove (1824) of bobbin (1210). It should be apparent that the first protrusion (1811) may be inserted into the second groove (1824), and the second protrusion (1812) may be inserted into the first groove (1823). However, the lens module (1020) may be also inserted into an inside through a bottom side of the lens driving unit (1000).

A coupling between the first protrusion (1811) and the first groove (1823) corresponds to a coupling between the second protrusion (1812) and the second groove (1824), and therefore, explanation will be centered on the coupling between the first protrusion (1811) and the first groove (1823) in the following description.

The first protrusion (1811) may be inserted into the first guide portion (1821) extended to a bottom side from an upper end of the bobbin (1210). The first protrusion (1811) may be guided by an inner lateral wall forming the first guide portion (1821). That is, the first protrusion (1811), in the process of the lens module (1020) being accommodated into a bottom side relative to the bobbin (1210), may be guided by the first guide portion (1821).

Subsequently, the first protrusion (1811) may be restricted in downward movement by being hitched at a distal end of the first guide portion (1821). Under this state, the first protrusion (1811) may move along the second guide portion (1822). That is, the lens module (1020) is rotated relative to the bobbin (1210). At this time, the rotating direction may be a clockwise direction or a counterclockwise direction. When the lens module (1020) is rotated relative to the bobbin (1210) at a predetermined angle, the first protrusion (1811) may be positioned at a distal end of the second guide portion (1822) or at its vicinity.

Under this state, the adhesive may be infused through the adhesive infuse hole (1830), and the infused adhesive may be infused between the first protrusion (1811) and the second guide portion (1822). Thereafter, the lens module (1020) is made to be rightly positioned relative to the (1210), and UV rays or heat is irradiated to harden or cure the epoxy (adhesive). The lens module (1020) may be coupled to the bobbin (1210) by the cured adhesive.

The lens module (1020) thus coupled can initially absorb an external shock by the adhesive even if the external shock is generated, and may be restricted in movement by the inner lateral wall forming the first protrusion (1811) and the second guide portion (1822). That is, the phenomenon can be minimized through the exemplary embodiment in which the lens module (1020) is moved from the bobbin (1210) by the external shock to generate a defect in resolution.

Figure 6:
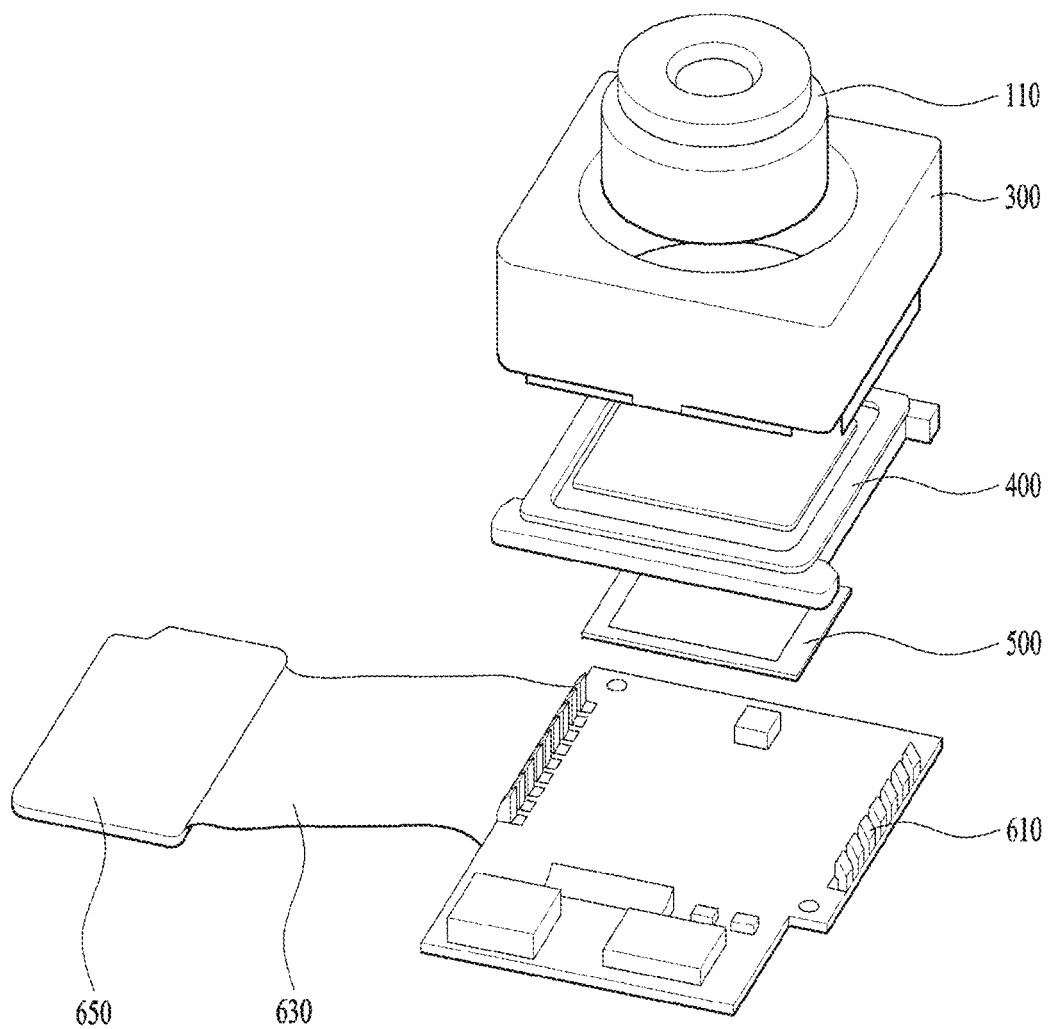
FIG. 6 is a schematic exploded perspective view illustrating a camera module according to an exemplary embodiment of the present invention.

FIG. 6 is a schematic exploded perspective view illustrating a camera module according to an exemplary embodiment of the present invention.

Referring to FIG. 6, the camera module according to an exemplary embodiment of the present invention may include a bobbin (110) including a lens barrel so formed as to be stacked with a plurality of lenses, a cover member (300) providing an accommodation space to accommodate the bobbin (110) and formed to accommodate the bobbin (110), a sensor holder (400) formed at a bottom surface of the cover member (300) to support the bottom surface of the cover member (300), an image sensor (500) disposed at one surface of the sensor holder (400) to convert a light incident from the bobbin (110) to an electric signal, and a substrate portion (600) providing a space for arranging the image sensor (500) and transmitting the electric signal converted by the image sensor (500) to a controller (not shown).

The sensor holder (400) may be interposed between a bottom surface of the cover member (300) and an upper surface of the substrate portion (600).

To be more specific, assembly may be such that the sensor holder (400) is attached to a bottom surface of the cover member (300) to allow the sensor holder (400) and the cover member (300) to be coupled, and is accommodated to an upper surface of the substrate portion (600) while the sensor holder (400) and the cover member (300) are in a coupled state.

However, this is an illustration of an exemplary embodiment, and a user may omit the sensor holder (400) if necessary, and allow the cover member (300) to be directly coupled to the substrate portion (600), the configuration of which does not restrict the scope of the present invention.

The sensor holder (400) may be so formed as to further include a filter portion (410) at a center thereof. The sensor holder (400) may take a hollow-holed shape in terms of optical sense, the configuration of which is for the lens barrel to collect a light from outside and to allow the light to pass through the sensor holder (400) for transmission of the light to the image sensor (500).

That is, the light collected from the outside by the lens barrel is made to pass through a center area of the sensor holder (400), where the filter portion (410) is arranged at the center area of the sensor holder (400) to allow a light of necessary wavelength band to be discriminated and transmitted to the image sensor (500).

The filter portion (410) according to an exemplary embodiment of the present invention may be an IR cut off filter. The IR cut off filter may include an IR area of wavelength band in which the outside light collected by the lens barrel cannot be seen by a man, where the image sensor (500) is a member blocking a light of wavelength band in the IR region in order to inhibit a light of IR region from being distorted to other colors different from actual colors by being recognized as such.

However, the filter portion (410) according to an exemplary embodiment of the present invention may be formed with a filter blocking other wavelength bands than the IR region if necessary, the configuration of which does not restrict the right scope of the present invention.

The substrate portion (600) may include a substrate base (610) providing one surface arranged with a bobbin (110), a cover member (300), a sensor holder (400) and an image sensor (500), a connector portion (650) transmitting a signal received from the substrate base (610) to a controller (not shown), and a connection substrate (630) in which one end is electrically connected to the substrate base (610), while the other end is electrically connected to the connector portion (650) to allow an electric signal generated by the substrate base (610) to be transmitted to the connector portion (650).

The connection substrate (630) may be formed by a flexible PCB (Flexible Printed Circuit Board). When the connection substrate (630) is formed with the FPCB, the connection substrate (630) can be freely bent unlike the conventional PCB, whereby the effect is that a limited space can be more efficiently utilized.

However, this is an explanation for the exemplary embodiment, and therefore, the connection substrate (630) may be changed to or used by other general PCBs apart from the FPCBs, if necessary, the configuration of which does not limit the right scope of the present invention.

Figure 7A:
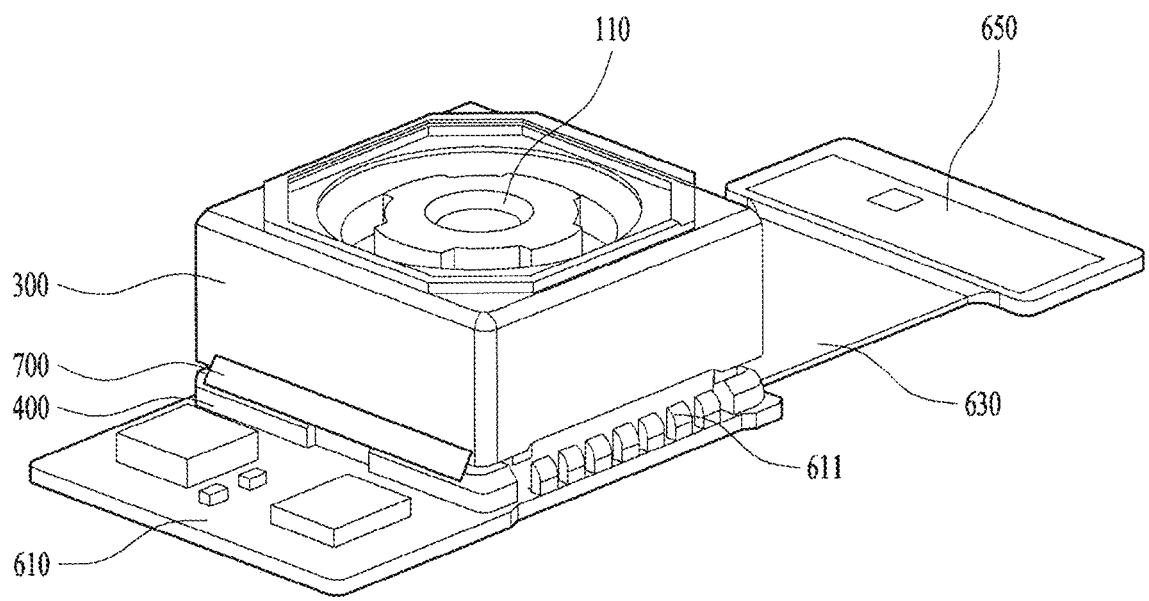
FIGS. 7(a) and 7(b) are schematic views illustrating an assembled state of lens barrel assembly, a sensor holder and a substrate according to an exemplary embodiment of the present invention.
Figure 7B:
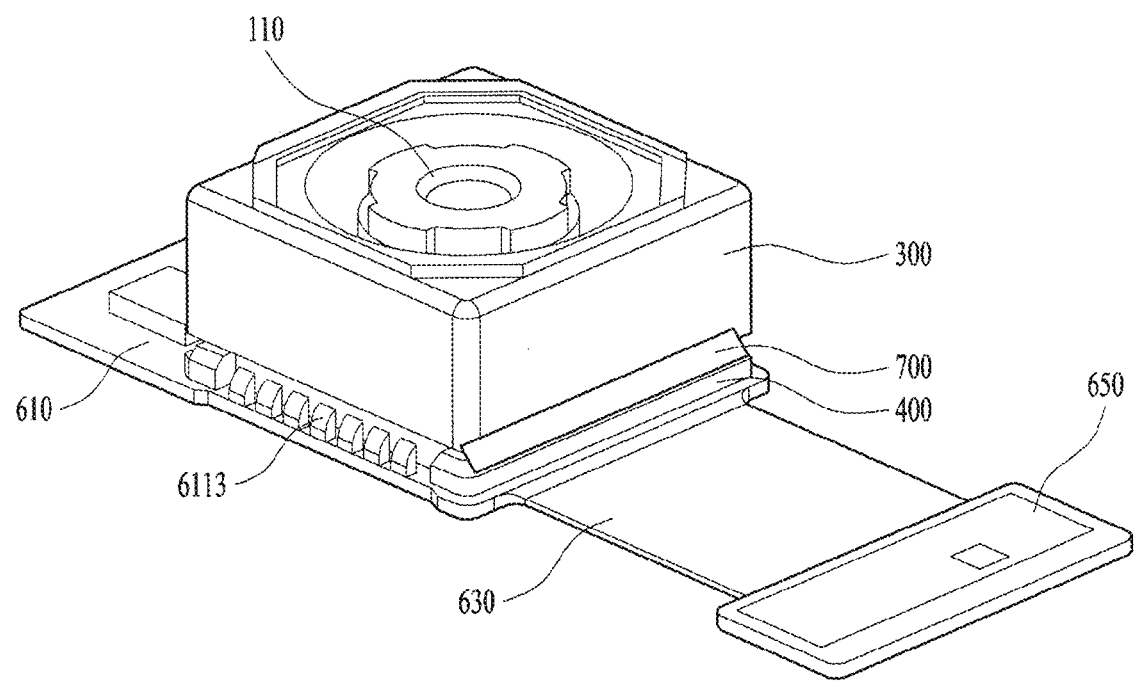

FIGS. 7(a) and 7(b) are schematic views illustrating an assembled state of lens barrel assembly, a sensor holder and a substrate according to an exemplary embodiment of the present invention.

Referring to FIGS. 7(a) and 7(b), an upper surface of the substrate base (610) may be sequentially stacked with the sensor holder (400), the image sensor (not shown) and the cover member (300) accommodating the bobbin (110).

The substrate base (610) may include, on at least one surface abutted by the substrate base (610) and the cover member (300), a substrate portion (600) and a plurality of terminal portions (611) electrically connecting the substrate portion (600) with the image sensor (500).

The terminal portion (611) may include a first terminal portion (6111) formed along a first surface of a bottom surface at the cover member (300), and a second terminal portion (6113) formed along a second surface opposite to the first surface of the bottom surface at the cover member (300).

Furthermore, an epoxy (700) may be included on a third surface adjacent to the first surface of the bottom surface at the cover member (300) arranged with the first terminal portion (6111), and on a fourth surface opposite to the third surface of the bottom surface at the cover member (300).

That is, the epoxy (700) may be arranged at the bottom surface of the cover member (300) not formed with the terminal portion (611), the reason of which is to inhibit an increased volume when the epoxy (700) is arranged at an upper surface of the terminal portion (611).

However, the epoxy (700) and the terminal portion (611) may be arranged at different positions depending on a user's need, and it suffices as long as the image sensor (500) and the substrate portion (600) are electrically connected through the terminal portion (611), and the cover member (300) and the sensor holder (400) are physically coupled. Therefore, the right scope of the present invention is not limited thereto.

Figure 8A:
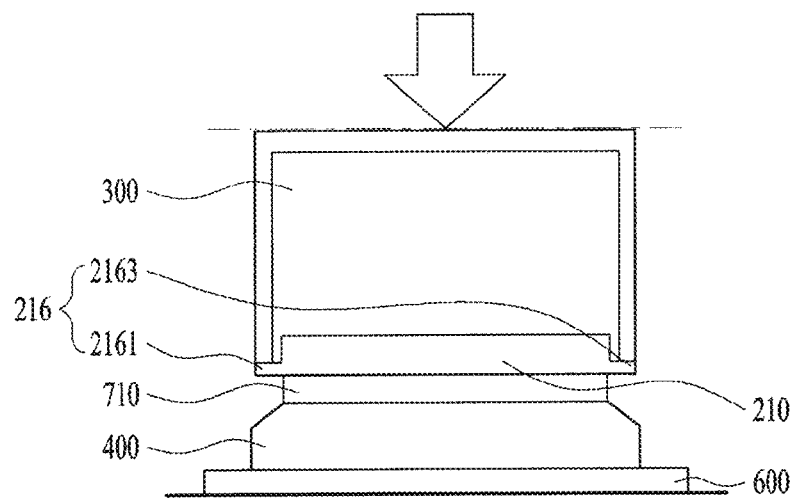
FIG. 8(a) is a schematic view illustrating a camera module before being formed with a second epoxy according to an exemplary embodiment of the present invention.
Figure 8B:
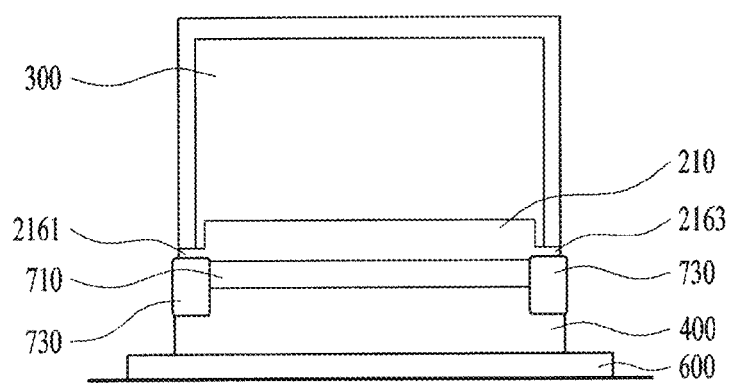
FIG. 8(b) is a schematic view illustrating a camera module after being formed with a second epoxy according to an exemplary embodiment of the present invention.

FIG. 8(a) is a schematic view illustrating a camera module before being formed with a second epoxy according to an exemplary embodiment of the present invention, and FIG. 8(b) is a schematic view illustrating a camera module after being formed with a second epoxy according to an exemplary embodiment of the present invention.

Referring to FIGS. 8(a) and 8(b), the camera module according to an exemplary embodiment of the present invention may include a cover member (300) forming an external look of the camera module, a base (210) disposed at one surface of the cover member (300) in order to support the cover member (300), a sensor holder (400) providing a space for accommodating the base (210), a first epoxy (710) interposed between the sensor holder (400) and the base (210) to attach the base (210) to the sensor holder (400), and a substrate portion (600) disposed at one surface of the sensor holder (400) and providing a space for arranging the image sensor (500, FIG. 7), and transmitting and converting an electric signal converted by the image sensor (500) to a controller (not shown).

The base (210) may include a base rib (216) protrusively formed at an outer circumferential surface to support the cover member (300).

To be more specific, the base rib (216) may include a first rib (2161) protruded toward an external direction of the base (210) in order to support a left lateral surface of the cover member (300), and a second rib (2163) protruded toward an external direction of the base (210) in order to support a right lateral surface of the cover member (300).

However, this is an explanation for the exemplary embodiment, and therefore, the shape of base rib (216) may be changed according to a user's need, and the base rib (216) suffices as long as it can support the cover member (300), and the right scope of the present invention is not limited by the previous exemplary embodiment of the present invention.

Although the base rib (216) illustrated in FIG. 8(a) is formed to support the cover member (300), there may be generated a problem of the base rib (216) being drooped to a direction parallel with the gravitational direction by a load of the cover member (300) or by an externally-applied shock.

As a result, a problem of defocusing caused by drooped base rib (216) that degrades a quality of camera module may be generated.

In order to solve the abovementioned problem, the camera module illustrated in FIG. 8(b) will be described in the following manner.

The basic structure of camera module illustrated in FIG. 8(b) is same as that of the camera module illustrated in FIG. 8(a), and therefore, the identical elements will be omitted in explanation and only differences are described hereinafter.

The first epoxy (710) is interposed between the base (210) and the sensor holder (400), where FIG. 8(a) shows that there is arranged no first epoxy (710) between the base rib (216) and the sensor holder (400), whereby a phenomenon of the base rib (216) being drooped by a load of cover member (300) or an externally-applied shock may be generated.

Thus, in order to inhibit the base rib (216) from being drooped, the camera module according to an exemplary embodiment of the present invention may include a second epoxy (730) between the sensor holder (400) and the base rib (216). The first epoxy (710) and the second epoxy (730) may be formed with a same material. Furthermore, first epoxy (710) and the second epoxy (730) may be formed with a mutually different material. The arrangement of second epoxy (730) between the sensor holder (400) and the base rib (216) may accomplish an effect of inhibiting the base rib (216) from being drooped by the load of or the externally-applied shock to the cover member (300).

Figure 9:
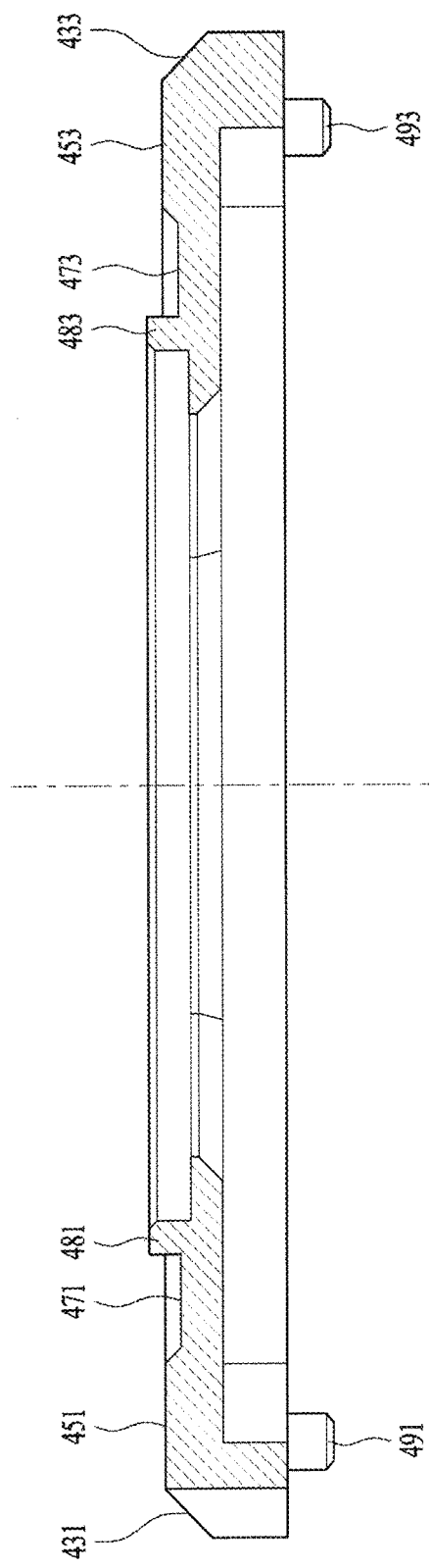
FIG. 9 is a schematic view illustrating a sensor holder of a lens driving apparatus according to an exemplary embodiment of the present invention.

FIG. 9 is a schematic view illustrating a sensor holder of a lens driving apparatus according to an exemplary embodiment of the present invention.

Referring to FIG. 9, the sensor holder (400) according to the exemplary embodiment may include a slope portion (431, 433) disposed at an external lateral surface of the sensor holder (400), an epoxy accommodation portion (451, 453) disposed at one surface of sensor holder (400) to accommodate the epoxy (700), a dust trap accommodation portion (471, 473) disposed at one surface of sensor holder (400) and arranged to be spaced apart at a predetermined distance from the epoxy accommodation portion (451,453) to an inner lateral radius direction, an upper protruding rib (481, 483) protruding at a predetermined height upward of the sensor holder (400) in order to inhibit foreign objects from penetrating from outside into a central part of the sensor holder (400), and a bottom protruding rib (491, 493) protruding at a predetermined height downward of the sensor holder (400) in order to fix the sensor holder (400) to the substrate portion (600, FIG. 8).

The slope portion (431, 433) may have an advantageous effect of hardening the epoxy (700) interposed between the sensor holder (400) and the cover member (300).

To be more specific, in order to harden the epoxy (700) in coupling the sensor holder (400) and the cover member (300) by arranging the epoxy (700) between the sensor holder (400) and the cover member (300), the UV (Ultraviolet) rays are initially used to initially harden the epoxy (700), and heat is applied to secondarily harden the epoxy (700) to securely couple the sensor holder (700) and the cover member (300).

At this time, the UV rays must be irradiated toward the epoxy (700) in the initial hardening process, and the advantageous effect is that the slope portion (431, 433) is formed at an outer lateral surface of the sensor holder (400) to allow the UV rays to be more efficiently irradiated toward the epoxy (700) and to thereby promote the hardening of epoxy (700).

The dust trap accommodation portion (471, 473) functions to inhibit the foreign objects such as dusts from penetrating into a central part of the sensor holder (400) coupled by the lens barrel assembly.

To be more specific, the dust trap accommodation portion (471, 473) may be formed to be recessed at an upper surface of the sensor holder (400) at a predetermined height. Furthermore, a dust trap (not shown) having an adhesive capacity may be disposed at a bottom surface of the dust trap accommodation portion (471, 473).

That is, when a foreign object introduced from outside is moved by self-weight to a direction parallel with the gravitational force, the foreign object may be adhered to the dust trap (not shown) having an adhesive capacity to be advantageously inhibited from entering into the central part of the sensor holder (400). However, the shape and arranged position of the dust trap accommodation portion (471, 473) may be changed depending on necessity, and the shape and arranged position of the dust trap accommodation portion (471, 473) are not limited as long as the foreign objects are inhibited from entering from outside into the central part of the sensor holder (400).

The epoxy accommodation portion (451,453) will be described in detail with reference to FIG. 10(a) to (d).

Figure 10A:
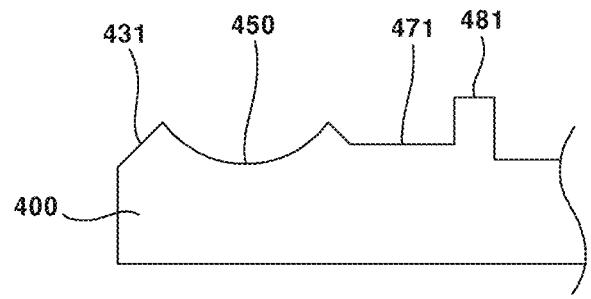
FIGS. 10(a)-10(d) are schematic views illustrating various exemplary embodiments of epoxy accommodation portions of sensor holder in a lens driving apparatus according to an exemplary embodiment of the present invention.
Figure 10B:
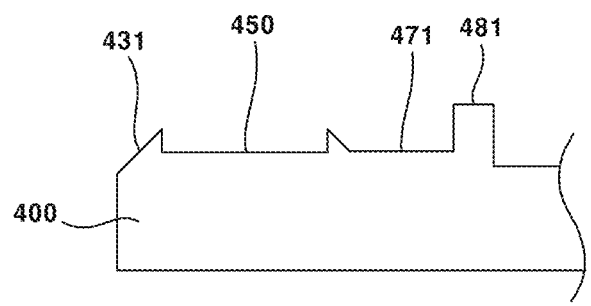
Figure 10C:
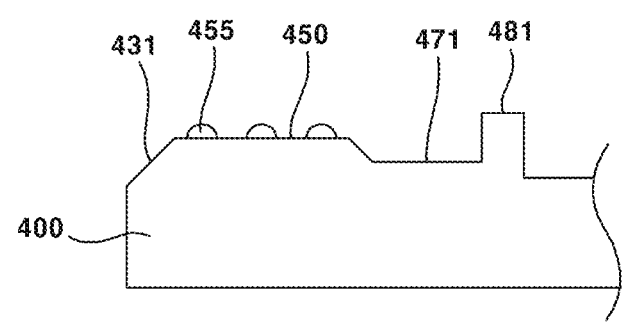
Figure 10D:
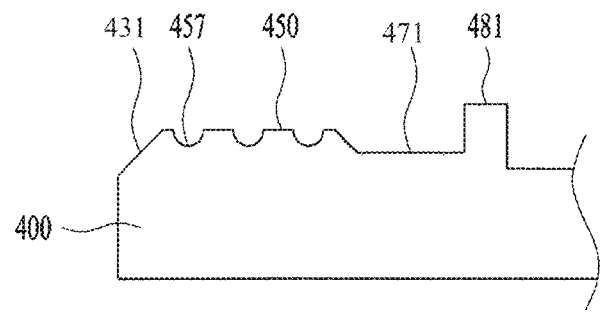

FIGS. 10(a) and 10(d) are schematic views illustrating various exemplary embodiments of epoxy accommodation portions of sensor holder in a lens driving apparatus according to an exemplary embodiment of the present invention.

Referring to FIG. 10(a) to (d), the epoxy accommodation portion (451, 453) of sensor holder (400) in a lens driving apparatus according to an exemplary embodiment of the present invention may be formed with a shape for more efficiently accommodating the first epoxy (710).

As illustrated in FIG. 10 (a), an epoxy accommodation portion (450) may be formed to be recessed toward a bottom direction, which is intended to broaden a space for accommodating the epoxy to effectively inhibit the epoxy (700) from being overflowed to its environment when the epoxy of more than is necessary is coated in the course of coating the epoxy (700) on the epoxy accommodation portion (450), because the epoxy accommodation portion (450) is formed to be recessed toward a bottom direction.

Referring to FIG. 10(b), the epoxy accommodation portion (450) may be so formed as to have a staircase. Because the epoxy accommodation portion (450) is formed with a staircase, and when the epoxy of more than is necessary is coated in the course of coating the epoxy (700), a space for accommodating the epoxy can be broadened to effectively inhibit the epoxy (700) from being overflowed to its environment.

However, although the staircase of the epoxy accommodation portion (450) illustrated in FIG. 10(b) may be formed in the number of one as illustrated in the drawing, the number of staircases may be formed in a plural number, if necessary, and the present invention is not limited thereto, which is not intended to limit the right scope of the present invention.

Referring to FIG. 10(c), the epoxy accommodation portion (450) may include a plurality of protrusion accommodation portions (455) formed to protrude towards an upper surface of the epoxy accommodation portion (450) at a predetermined height.

The shape of cross-section of the protrusion accommodation portion (455) may be semispherical as illustrated in FIG. 10(c) or triangular, and may take other shapes depending on necessity. Because the plurality of protrusion accommodation portions (455) formed on the epoxy accommodation portion (450), a surface area contacted between the protrusion accommodation portions (455) and the epoxy coated on the epoxy accommodation portion (450) can be broadened to allow the epoxy (700) and the epoxy accommodation portion (450) to be more effectively and more securely coupled.

Now, referring to FIG. 10(*d*), the epoxy accommodation portion (450) may include a plurality of recess accommodation portions (457) concavely formed at an upper surface of the epoxy accommodation portion (450).

The shape of cross-section of the recess accommodation portion (457) may be semispherical as illustrated in FIG. 10(*c*) or triangular, and may take other shapes depending on necessity. Because the plurality of recess accommodation portions (455) formed on the epoxy accommodation portion (450), a surface area contacted between the recess accommodation portions (457) and the epoxy coated on the epoxy accommodation portion (450) can be broadened to allow the epoxy (700) and the epoxy accommodation portion (450) to be more effectively and more securely coupled.

Although FIGS. 10(*a*) to 10(*b*) have illustrated several exemplary embodiments of different shapes of epoxy accommodation portions (451, 453), the shapes of epoxy accommodation portions (451, 453) are not limited thereto, and the slope portions (431, 433) may be formed in the same shapes as those of the epoxy accommodation portions (451, 453).

Figure 11:
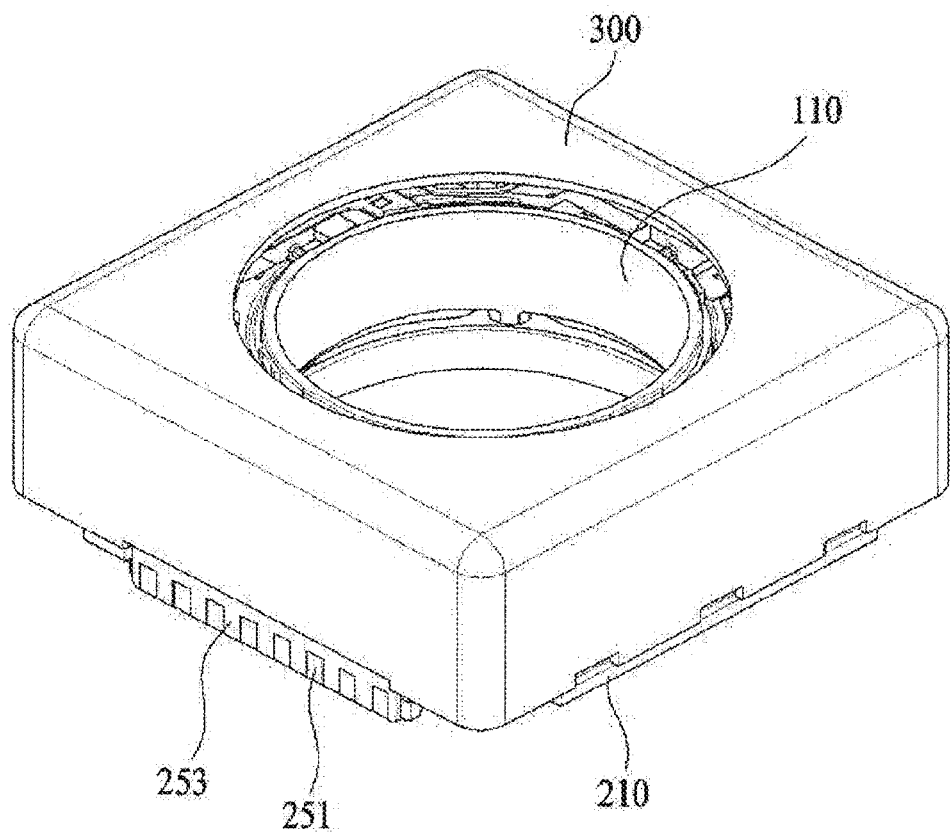
FIG. 11 is a schematic perspective view illustrating a lens driving apparatus according to an exemplary embodiment of the present invention.
Figure 12:
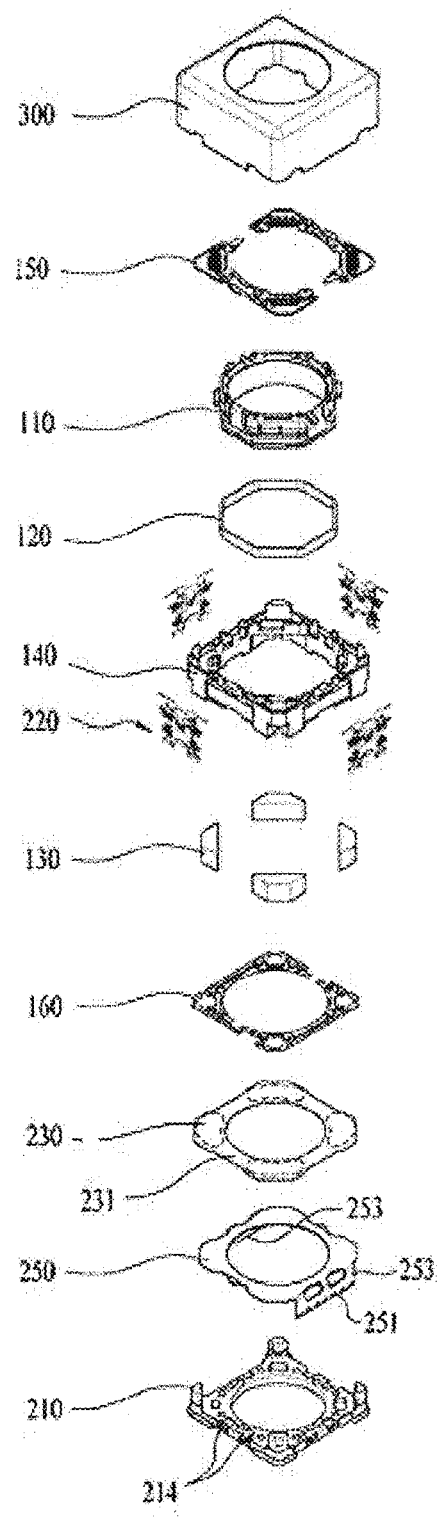
FIG. 12 is an exploded perspective view illustrating a lens driving apparatus according to an exemplary embodiment of the present invention.

FIG. 11 is a schematic perspective view illustrating a lens driving apparatus according to an exemplary embodiment of the present invention, and FIG. 12 is an exploded perspective view illustrating a lens driving apparatus exemplified in FIG. 11.

Referring to FIG. 11, the lens driving apparatus according to an exemplary embodiment of the present invention may include a first lens driving unit (not shown), a second lens driving unit (not shown) and a cover member (300). Here, the first lens driving unit (100) may perform the function of aforesaid AF apparatus and the second lens driving unit (200) may perform the function of aforesaid OIS apparatus.

The cover member (300) may substantially be provided with a box shape to cover the first and second lens driving units (not shown).

As illustrated in FIG. 12, the lens driving apparatus according to an exemplary embodiment of the present invention may include a mover portion. At this time, the mover portion can perform the AF and OIS functions for lens. The mover portion may include a bobbin (110), a first coil (120), a first magnet (130), a housing (140), an upper elastic member (150), and a bottom elastic member (160).

The bobbin (110) may be formed at an outer circumferential surface with the first coil (120) arranged at an inner side of the first magnet (130), and may be reciprocally mounted to a first direction at an inner space of the housing (140) through the electromagnetic interaction between the first magnet (130) and the first coil (120). The outer circumferential surface of the bobbin (110) may be mounted with the first coil (120) to enable an electromagnetic interaction with the first magnet (130).

Furthermore, the bobbin (110) may be elastically supported by the upper and bottom elastic members (150, 160) to perform the AF function by moving to the first direction. The bobbin (110) may include a lens barrel (not shown) mounted therein with at least one lens. The lens barrel may be coupled to an inner side of the bobbin (110) by various methods.

For example, an inner circumferential surface of bobbin (110) may be formed with female screw threads, and an outer circumferential surface of the lens barrel may be formed with male screw threads corresponding to the female screw threads to couple the lens barrel to the bobbin (110) through the screw coupling. However, the present invention is not limited thereto, and, as an additional coupling method, the lens barrel can be directly coupled to an inner side of the bobbin (110) without forming the screw threads at the inner circumferential surface of the bobbin (110). Alternatively, one sheet of lens may be integrally formed with the bobbin (110) free from the lens barrel.

The lens coupled to the lens barrel may be formed with one sheet, or two or more lenses may be used to form an optical system.

The AF function may be controlled by direction of current, and an operation of moving the bobbin (110) to the first direction may implement the AF function. For example, when a current is applied to a forward direction, the bobbin (110) may move upwards from an initial position, and when a current is applied to a reverse direction, the bobbin (110) may move downwards from the initial position. Alternatively, an amount of current to one direction may be also adjusted to increase or decrease a distance to one direction from an initial position.

An upper surface and a bottom surface of bobbin (110) may be protrusively formed with a plurality of upper support lugs and a plurality of bottom support lugs. The upper support lug may take a cylindrical shape, or a prismatic shape to couple or fix the upper elastic member (150). The bottom support lug may be provided with a cylindrical shape or a prismatic shape as the upper support lug, to couple or fix the bottom elastic member (160).

The upper elastic member (150) may be formed at an upper side of the bobbin (110), and the bottom elastic member (160) may be formed at a bottom side of the bobbin (110). At this time, the upper elastic member (150) may be formed with a through hole corresponding to the upper support lug, and the bottom elastic member (160) may be formed with a through hole corresponding to the bottom support lug. Each of the support lugs and through holes may be fixedly coupled by thermal fusion or an adhesive such as epoxy.

The housing (140) having a shape of a hollowed pillar supporting the first magnet (130) may substantially take a square shape. A lateral surface portion of the housing (140) may be arranged by the first magnet (130) and the support member (220) being respectively coupled.

Furthermore, the housing (140) thus configured may be arranged at an inside thereof with the bobbin (110) moving to the first direction by being guided by the elastic member (150, 160). In the exemplary embodiment, the first magnet (130) may be arranged at a corner area of the housing (140), and a lateral surface may be arranged with a support member (220).

The upper elastic member (150) and the bottom elastic member (160) can elastically support ascending and/or descending operations to a first direction of the bobbin (110). Each of the upper elastic member (150) and the bottom elastic member (160) may be formed with a leaf spring.

As illustrated in FIG. 7, the upper elastic member (150) may be formed by being divided into two pieces. Through this two-split structure, each divided portion of the upper elastic member may be applied with a current of mutually different polarity or a power of mutually different polarity. Furthermore, as a modification, the bottom elastic member (160) may be formed by being split into two pieces, and the upper elastic member (150) may be configured by being integrally formed.

Meantime, the upper elastic member (150), the bottom elastic member (160), the bobbin (110) and the housing (140) may be assembled through a thermal fusion and/or a bonding operation using an adhesive. At this time, a fixing operation may be finished by bonding using an adhesive after fixation by thermal fusion.

The base (210) may be provided at a bottom surface of bobbin (110) with a substantially square shape, may be accommodated with a PCB (250) and may be fixed by a bottom side of the support member (220). Furthermore, an upper surface of base (210) may be concavely formed with a support member (220) accommodation groove (214) insertable by the support member (220). The support member (220) accommodation groove (214) may be coated with an adhesive to fix the support member (220) lest the support member (220) be moved.

A support groove may be formed having a size corresponding to that of a surface opposite to an area formed with a terminal surface (253) of the PCB (250) at the base (210). The support groove may be concavely and inwardly formed from an outer circumferential surface of the base (210) at a predetermined depth, to inhibit an area formed with the terminal surface (253) from protruding outside or to adjust the protrusion.

The support member (220) may be arranged at a lateral surface of the housing (140) with an upper side to be coupled to the housing (140) and with a bottom side to be coupled to the base (210), and to movably support the bobbin (110) and the housing (140) to a second direction perpendicular to the first direction to a third direction, and may be electrically connected to the first coil (120).

Each of the support members (220) according to an exemplary embodiment of the present invention may be arranged at an outer lateral surface of square-shaped housing (140), where a total of four support members (220) may be symmetrically installed. The present invention is not limited thereto, and it may be possible for two each, a total of eight support members (220), to be formed at each straight line surface. Furthermore, the support member (220) may be electrically connected to the upper elastic member (150), or alternatively, may be electrically connected to a straight line surface of the upper elastic member.

Furthermore, the support member (220) is formed as a separate member from (220) the upper elastic member (150), such that the support member (220) and the upper elastic member (150) may be electrically connected using a conductive adhesive or by soldering. Thus, the upper elastic member (150) can apply a current to the first coil (120) through the electrically-connected support member (220).

Meanwhile, although FIG. 12 has illustrated a plate-shaped support member (220) as one exemplary embodiment, the present invention is not limited thereto. That is, the support member may be formed in the shape of a wire.

The second coil (230) may perform the OIS function by moving the housing (140) to the second and/or to the third direction through an electromagnetic interaction with the first magnet (130).

Here, the second and third directions may include not only x axis and y axis directions but also directions substantially near to the x axis and y axis. That is, in light of driving aspect according to an exemplary embodiment, although the housing (140) may move in parallel with x axis and y axis, the housing (140) may slightly slantedly move relative to x axis and y axis while moving by being supported by the support member (220).

Furthermore, there may be a need for the first magnet (130) to be installed at a position corresponding to that of the second coil (230).

The second coil (230) may be arranged opposite the first magnet (130) fixed to the housing (140). As an exemplary embodiment, the second coil (230) may be arranged at an outside of the first magnet (130). Alternatively, the second coil (230) may be installed at bottom side of the first magnet spaced apart at a predetermined distance.

According to an exemplary embodiment, the second coil (230) may be installed at each four corner of circuit member (231) in the total number of four. However, the present invention is not limited thereto, and only a total of two, one for the second direction and one for third direction may be installed, or more than four may be installed.

In the present exemplary embodiment, although a circuit pattern is formed on the circuit member (231) in the shape of a second coil (230), and a separate second coil may be additionally arranged at an upper surface of the circuit member (231), the present invention is not limited thereto, the circuit member (231) may not be formed with a circuit pattern on the shape of second coil (230), and only a separate second coil (230) may be arranged at an upper surface of the circuit member (231).

Alternatively, the second coil (230) may be formed with a wire in the shape of a donut, or the second coil (230) may be also formed in an FP coil type to be electrically connected to the PCB (250).

The second coil (230) may be arranged at an upper surface of the base (210) and a bottom surface of the housing (140). At this time, the circuit member (231) including the second coil (230) may be installed at an upper surface of PCB (250) arranged at an upper side of the base (210).

However, the present invention is not limited thereto, and the second coil (230) may be also tightly and closely arranged to the base (210), may be spaced apart at a predetermined distance, or may be also formed on a separate substrate to allow the substrate to be stacked on and connected to the PCB (250).

The PCB (250) may be coupled to an upper surface of the base (210), and as illustrated in FIG. 12, a through hole or a groove may be formed at a corresponding position to allow the support member (220) accommodation groove (214) to be exposed.

The PCB (250) may be formed with a terminal surface (253) formed with a terminal (251) that is formed by being bent. In the exemplary embodiment, two bent terminal surface (253)-formed PCB (250) are illustrated. The terminal surface (253) may be arranged with a plurality of terminals (251) to receive an outside electric power whereby the first coil (120) and the second coil can be supplied with a current. The number of terminals formed on the terminal surface (253) may be increased or decreased depending on the types of elements necessary for control. Furthermore, the PCB (250) may be formed with the terminal surface (253) in the number of one or more than three.

The cover member (300) may be provided in a substantially boxed shape to accommodate the mover portion, the second coil (230) and a part of PCB (250), and may be coupled to the base (210). The cover member (300) can protect the mover portion, the second coil (230) and the PCB (250) accommodated therein lest the mover portion, the second coil (230) and the PCB (250) be damaged and particularly can concentrate electromagnetic fields by limiting the exposure to outside of the electromagnetic fields generated from the mover portion, the second coil (230) and the PCB (250) accommodated therein.

Figure 13:
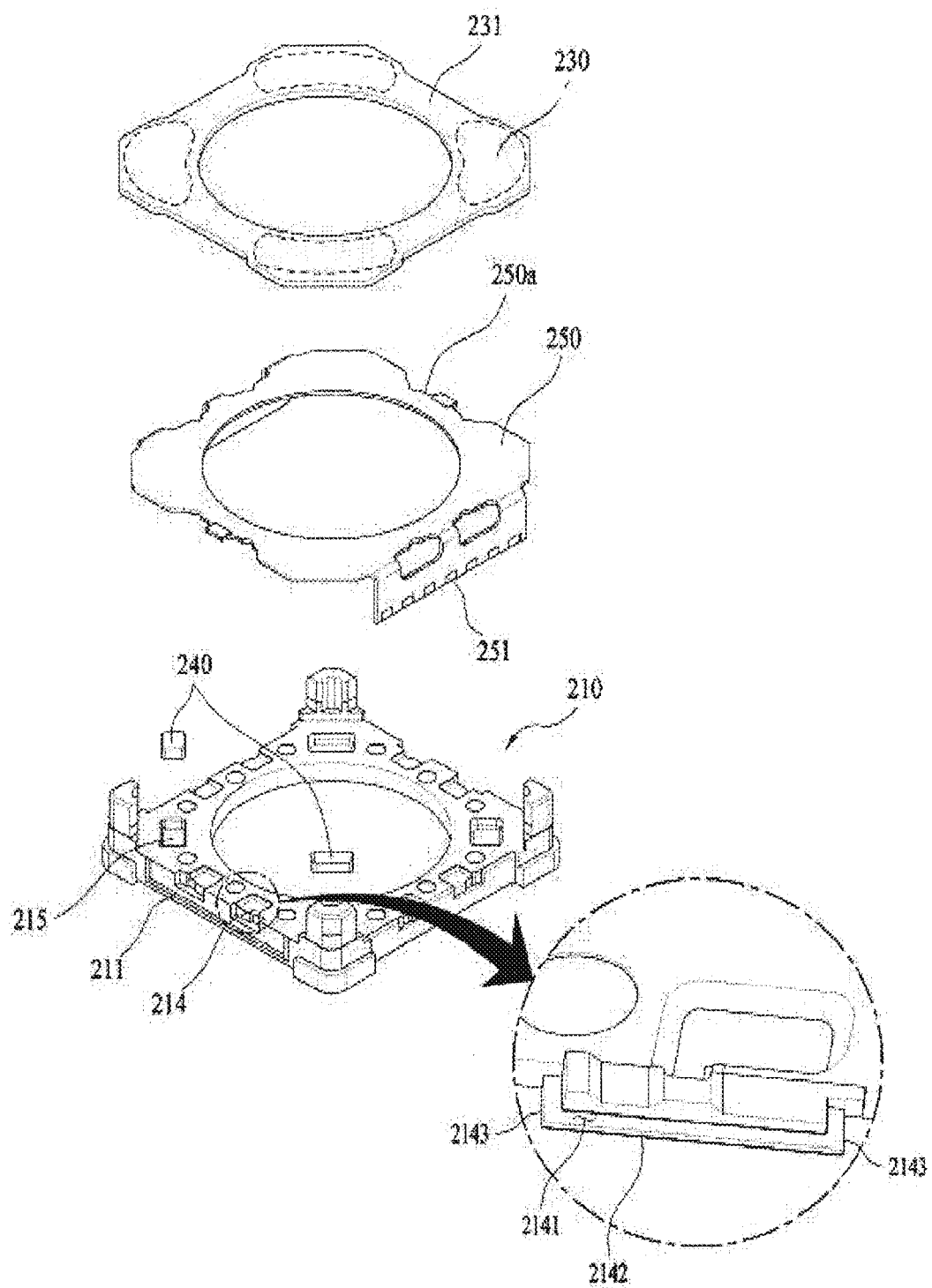
FIG. 13 is a schematic view illustrating a base, a PCB and a second coil according to an exemplary embodiment of the present invention.

FIG. 13 is a schematic view illustrating a base (210), a PCB (250) and a second coil (230) according to an exemplary embodiment of the present invention. The lens driving apparatus may further include a position detection sensor (240).

The position detection sensor (240) may be arranged at a center of the second coil (230) to detect the movement of housing (140). At this time, the positon detection sensor (240) can basically detect a first direction movement of the housing (140), and if necessary, may be so formed as to detect second and third direction movements of the housing (140).

The position detection sensor (240) may be provided with a Hall sensor. However, the present invention is not limited thereto, and any sensor capable of detecting changes in magnetic force may be also used for the position detection sensor. The position detection sensor (240), as illustrated in FIG. 13, may be installed at a corner portion of base (210) arranged at a bottom side of the PCB (250) in a total number of two, and the mounted position detection sensor (240) may be insertedly arranged at a position detection sensor accommodation groove (215) formed at the base (210). A bottom surface of the PCB (240) may be an opposite surface of a surface arranged with the second coil (230).

Meanwhile, the position detection sensor (240) may be arranged at a bottom side of the second coil (230), being spaced apart at a predetermined distance, across the PCB (250). That is, the position detection sensor (240) may not be directly connected to the second coil (230), and the second coil (230) may be installed at an upper surface based on the PCB (250), and the position detection sensor (240) may be installed at a bottom surface based on the PCB (250).

Meantime, the lens driving apparatus according to the previously mentioned exemplary embodiment may be used in various fields, for instance including a camera module. The camera module may be applicable to mobile devices such as mobile phones, for example.

The camera module according to an exemplary embodiment may include a lens barrel coupled with a bobbin (110) and an image sensor (not shown). At this time, the lens barrel may include at least one sheet of lens transmitting an image to the image sensor.

Furthermore, the camera module may further include an IR cut-off filter (not shown). The IR cut-off filter may function to inhibit a light of IR region from being incident on the image sensor. In this case, the IR cut-off filter may be installed at a position corresponding to that of the image sensor in the base exemplified in FIG. 11, and may be coupled to a holder member (not shown). Furthermore, the holder member may support a bottom side of the base (210).

The base (210) may be installed with a separate terminal member in order to be electrically conducted to the PCB (250), and it may be possible to integrally form the base with a terminal using a surface electrode. Still furthermore, the base (210) may further include an adhesive member (211) in order to attach the PCB (250) to the base (210). The adhesive member (211) may be formed at one lateral surface of base (210), and as illustrated, may be formed at a position where one lateral surface of the PCB (250) is surface-contacted. Although it is illustrated that the adhesive member (211) in the exemplary embodiment is formed at one surface of the base (210), the adhesive member (211) may be further formed at a surface opposite a surface formed with an adhesive member (211). The adhesive member (211) in the present exemplary embodiment is an exemplary embodiment, and it suffice as long as the adhesive member can adhere the PCB (250) to the base (210), and the position and the number of adhesive members (211) may not restrict the right scope of the present invention.

An accommodation groove (214) of the base (210) may further include a staircase portion to order to couple a spring unit (not shown).

The adhesive member (211) may be formed at one surface of base (210) in order to mutually adhere the base (210) to the PCB (250), and when an amount of adhesive member (211) is small, the adhesive strength between the base (210) and the PCB (250) may be decreased to generate a floating phenomenon of the PCB (250) from the base (210), and when the amount of adhesive member (211) is great, the adhesive member (211) may penetrate the accommodation groove (214) to generate a problem of the spring unit (not shown) not being accurately coupled to the accommodation groove (214).

Hence, a staircase may be further formed on the accommodation groove (214) of the base (210) to inhibit the adhesive member (211) from penetrating the accommodation groove (214).

The staircase may include at least one lateral surface portion (2143) forming a lateral surface of the staircase, a bottom surface portion (2142) forming a bottom surface of the staircase, and a staircase space (2141) accommodating the adhesive member (211) by being formed by the lateral surface portion (2143) and the bottom surface portion (2142).

A cross-section of the bottom surface portion (2142) at the staircase (2141) may be formed in the shape of a planar surface. Furthermore, a cross-section of the bottom surface portion (2142) at the staircase space (2141) may be formed in a convex shape towards a first direction perpendicular to the bottom surface portion (2142).

Because the cross-section of the bottom surface portion (2142) at the staircase space (2141) is formed in a convex shape towards the first direction perpendicular to the bottom surface portion (2142), the adhesive member (211) can be collected toward both lateral surfaces of the bottom surface portion (2142) to more effectively inhibit the adhesive member (211) from being introduced into the accommodation groove (214).

Furthermore, a cross-section of the bottom surface portion (2142) at the staircase space (2141) may be concavely formed toward the first direction perpendicular to the bottom surface portion (2142).

Because the cross-section of the bottom surface portion (2142) at the staircase space (2141) is concavely formed toward the first direction perpendicular to the bottom surface portion (2142), the adhesive member (211) can be collected toward a center of the bottom surface portion (2142) to more effectively inhibit the adhesive member (211) from being introduced into the accommodation groove (214).

Furthermore, the cross-section of the bottom surface portion (2142) at the staircase space (2141) may be formed in a sinusoidal shape. Because the cross-section of the bottom surface portion (2142) at the staircase space (2141) is formed in a sinusoidal shape, the adhesive member (211) can be collected into a plurality of recesses formed at the bottom surface portion (2142) to more effectively inhibit the adhesive member (211) from being introduced into the accommodation groove (214).

Furthermore, although the present exemplary embodiment has illustrated the staircase portion formed in the number of one, the staircase portion may be formed in a plural number.

Because the staircase portion is formed in a plural number, a space capable of accommodating the adhesive member (211) can be formed in double or triple manner, the introduction of adhesive member (211) into the accommodation groove (214) can be more effectively inhibited.

The bottom surface portion (2142) may further include a plurality of protrusion members (2144). The plurality of protrusion members (2144) may be protruded each at a predetermined height toward an upper surface from the bottom surface portion (2142).

Because the bottom surface portion (2142) further includes a plurality of protrusion members (2144), the adhesive member (211) introduced into the staircase portion can be more effectively inhibited from being introduced into the accommodation groove (214) due to increased resistance in flow for the adhesive member (211) introduced into the staircase portion.

Although the drawing has illustrated the plurality of protrusion members formed in a semispherical shape, it is a mere example, and the present invention is not limited thereto, and the protrusion member (2144) may be formed in a conical shape and a polygonal shape.

Meantime, the base (210) may function as a sensor holder protecting an image sensor, and in this case, a lug may be downwardly formed along a lateral surface of base (210). However, this is not an essential element, and albeit not being illustrated, a separate sensor holder may be arranged at a bottom surface of base (210) to function as a sensor holder.

Figure 14:
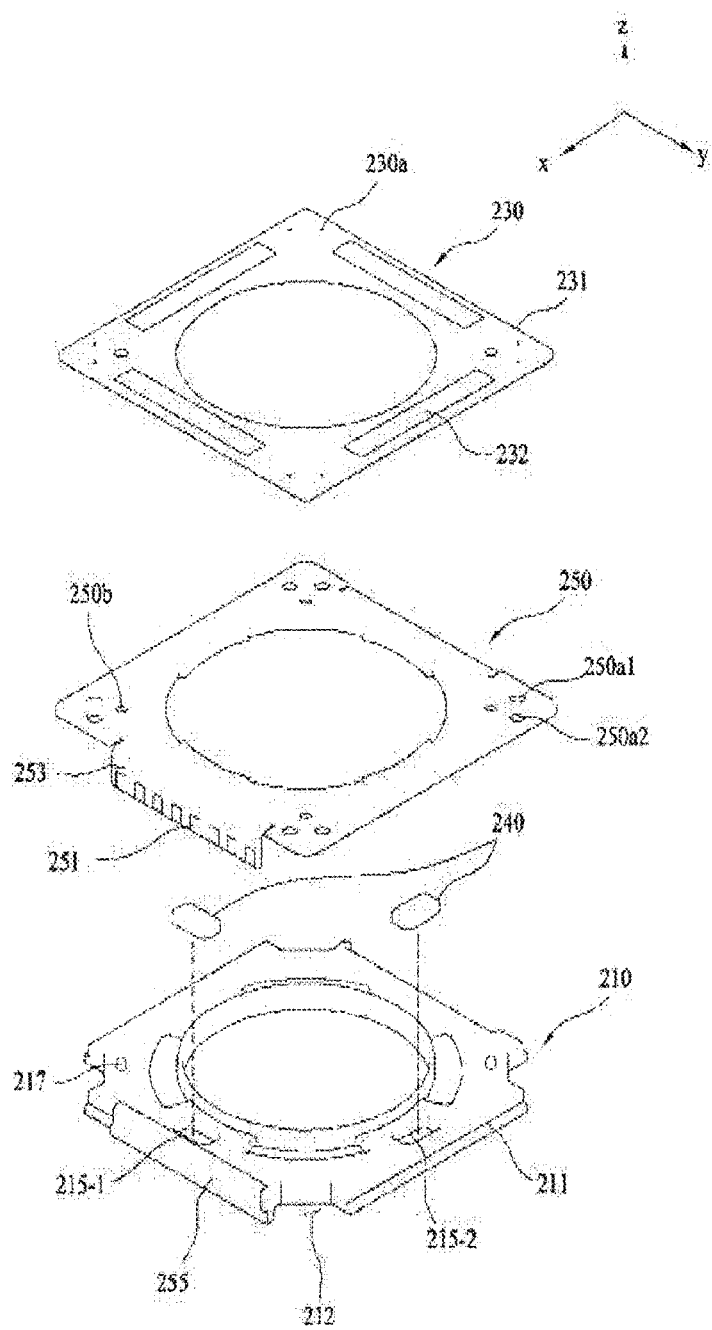
FIG. 14 is a schematic view illustrating a second coil, a circuit substrate and a base on a lens driving apparatus according to an exemplary embodiment of the present invention.

FIG. 14 is a schematic view illustrating a second coil, a circuit substrate and a base on a lens driving apparatus according to an exemplary embodiment of the present invention.

Meanwhile, referring to FIG. 14, the second coil (230) may include a fifth through hole (230a) passing through a corner portion of the circuit member (231). The support member (220) may pass through the fifth through hole (230a) to be connected to the circuit substrate (250). Alternatively, when the second coil (230) takes an FP coil shape, an OIS coil (232) may be formed or arranged at some portions of FP coil. Furthermore, the fifth through hole (230a) may not be formed at a portion where the fifth through hole (230a) is formed at the second coil (230), and the portion may be electrically soldered by the support member (220).

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device comprising:
a base;
a housing disposed on the base;
a bobbin disposed in the housing;
a first coil disposed on the bobbin;
a magnet disposed on the housing and facing the first coil; and
a circuit board disposed on the base and comprising a second coil facing the magnet,
wherein the circuit board comprises a body portion disposed on the base and a terminal portion extending from an edge of the body portion and comprising a terminal,
wherein the body portion comprises first and second edges opposite to each other,
wherein the terminal portion comprises a first terminal portion extending from the first edge of the body portion and a second terminal portion extending from the second edge of the body portion,
wherein the base comprises first and second lateral surfaces opposite to each other and third and fourth lateral surfaces opposite to each other,
wherein the first terminal portion is disposed on the first lateral surface of the base,
wherein the second terminal portion is disposed on the second lateral surface of the base,
wherein the base comprises a groove formed on at least one of the third and fourth lateral surfaces of the base,
wherein at least a portion of an adhesive is disposed on a surface of the groove of the base,
wherein the base comprises an additional groove formed on the groove of the base, and
wherein the additional groove is further recessed than the groove of the base.

2. The lens driving device of claim 1, comprising:
a cover member comprising an upper plate and a lateral plate extending from the upper plate,
wherein the at least a portion of the adhesive is disposed between the lateral plate of the cover member and the base.

3. The lens driving device of claim 2, wherein the lateral plate of the cover member is overlapped with the base in a direction perpendicular to an optical axis, and
wherein the adhesive is disposed between the lateral plate of the cover member and the base in the direction perpendicular to the optical axis.

4. The lens driving device of claim 1, wherein the groove comprises a staircase space formed on the at least one of the third and fourth lateral surfaces of the base.

5. The lens driving device of claim 1, wherein the base comprises a recess recessed from the first and second lateral surfaces of the base, and
wherein at least a portion of the terminal portion is disposed on the recess of the base.

6. The lens driving device of claim 1, comprising:
a sensor coupled to the circuit board and to sense the magnet,
wherein the circuit board is disposed on an upper surface of the base,
wherein the base comprises a sensor accommodation groove formed on the upper surface of the base, and
wherein the sensor is disposed on the sensor accommodation groove of the base.

7. The lens driving device of claim 6, wherein the groove of the base is spaced apart from the sensor accommodation groove of the base.

8. The lens driving device of claim 1, wherein the groove comprises first and second surfaces opposite to each other, and
wherein the at least a portion of the adhesive is disposed between the first and second surfaces of the groove.

9. The lens driving device of claim 1, wherein the circuit board comprises a circuit member comprising the second coil.

10. The lens driving device of claim 1, wherein the second coil is formed as a FP (Fine Pattern) coil formed on the circuit board.

11. The lens driving device of claim 1, comprising:
an upper elastic member connecting the housing and the bobbin; and
a lower elastic member connecting the housing and the bobbin and disposed below the upper elastic member,
wherein at least one of the upper elastic member and the lower elastic member is electrically connected with the first coil.

12. The lens driving device of claim 11, comprising:
a support member electrically connecting the circuit board and the upper elastic member.

13. The lens driving device of claim 12, wherein the support member comprises a wire.

14. A camera module comprising:
a PCB (Printed Circuit Board);
an image sensor disposed on the PCB;
the lens driving device of claim 1; and
a lens coupled to the bobbin of the lens driving device.

15. An optical apparatus comprising:
a main body;
the camera module of claim 14 to photograph a subject; and
a display portion disposed on a surface of the main body to output an image photographed by the camera module.

16. A lens driving device comprising:
a base:
a cover member disposed on the base and comprising an upper plate and a lateral plate extending from the upper plate;
a housing disposed in the cover member;
a bobbin disposed in the housing;
a first coil disposed on the bobbin;
a magnet disposed on the housing and facing the first coil; and
a circuit board disposed on the base and comprising a second coil facing the magnet,
wherein the circuit board comprises a body portion disposed on the base and a terminal portion extending from an edge of the body portion and comprising a terminal,
wherein the body portion comprises first and second edges opposite to each other,
wherein the terminal portion comprises a first terminal portion extending from the first edge of the body portion and a second terminal portion extending from the second edge of the body portion,
wherein the base comprises first and second lateral surfaces opposite to each other and third and fourth lateral surfaces opposite to each other,
wherein the first terminal portion is disposed on the first lateral surface of the base,
wherein the second terminal portion is disposed on the second lateral surface of the base, and
wherein an adhesive is disposed between the lateral plate of the cover member and at least one of the third and fourth lateral surfaces of the base,
wherein the base comprises a groove formed on at least one of the third and fourth lateral surfaces of the base,
wherein at least a portion of the adhesive is disposed on a surface of the groove of the base,
wherein the base comprises an additional groove formed on the groove of the base, and
wherein the additional groove is further recessed than the groove of the base from the at least one of the third and fourth lateral surfaces of the base.

17. The lens driving device of claim 16, wherein the lateral plate of the cover member is overlapped with the base in a direction perpendicular to an optical axis, and
wherein the adhesive is disposed between the lateral plate of the cover member and the base in the direction perpendicular to the optical axis.

18. The lens driving device of claim 17, wherein the groove comprises a staircase space formed on the at least one of the third and fourth lateral surfaces of the base.

19. The lens driving device of claim 16, wherein the base comprises a recess recessed from the first and second lateral surfaces of the base, and
wherein at least a portion of the terminal portion is disposed on the recess of the base.

20. The lens driving device of claim 16, wherein the circuit board comprises a circuit member comprising the second coil.

* * * * *